US011878514B2

(12) United States Patent

Maida et al.

(10) Patent No.: US 11,878,514 B2

(45) Date of Patent: Jan. 23, 2024

(54) BLOWING UNIT, DRYING DEVICE, LIQUID APPLYING SYSTEM, AND PRINTING SYSTEM

(71) Applicant: FUJIFILM Corporation, Tokyo (JP)

(72) Inventors: Noriaki Maida, Kanagawa (JP); Takanori Hamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/824,661

(22) Filed: May 25, 2022

(65) Prior Publication Data

US 2022/0402281 A1 Dec. 22, 2022

(30) Foreign Application Priority Data

Jun. 22, 2021 (JP) ................................ 2021-103380

(51) Int. Cl.
*B41J 11/00* (2006.01)

(52) U.S. Cl.
CPC .... *B41J 11/00222* (2021.01); *B41J 11/00224* (2021.01)

(58) Field of Classification Search
CPC ............ B41J 11/00222; B41J 11/00224; B41J 11/0022; B41J 11/002
See application file for complete search history.

(56) References Cited

U.S. PATENT DOCUMENTS

| | | | | |
|---|---|---|---|---|
| 2013/0050370 | A1 | 2/2013 | Sasaki et al. | |
| 2019/0100034 | A1 | 4/2019 | Yoda | |
| 2019/0100039 | A1 | 4/2019 | Matsuoka | |
| 2019/0263143 | A1* | 8/2019 | Nishimura ................ | F24H 3/02 |

FOREIGN PATENT DOCUMENTS

JP 2002-292841 A 10/2002

OTHER PUBLICATIONS

The extended European search report issued by the European Patent Office dated Nov. 4, 2022, which corresponds to European Patent Application No. 22175331.2-1014 and is related to U.S. Appl. No. 17/824,661.

* cited by examiner

*Primary Examiner* — Bradley W Thies
(74) *Attorney, Agent, or Firm* — Studebaker & Brackett PC

(57) ABSTRACT

Provided are a blowing unit, a drying device, a liquid applying system, and a printing system with which it is possible to realize uniformly blowing air via a plurality of jetting ports.

In a blowing unit that has a hollow structure and blows air via a plurality of jetting ports disposed at a first surface, a gas inflow port through which a gas supplied from a gas supply source flows in is formed in a second surface which intersects the first surface and at which the jetting ports are not disposed and a ratio of a sum of opening areas of the plurality of jetting ports to an opening area of the gas inflow port is equal to or larger than 0.1 and equal to or smaller than 1.0.

10 Claims, 13 Drawing Sheets

FIG. 13

| | PLATE THICKNESS | | | |
|---|---|---|---|---|
| | SMALLER THAN 1.5 mm | EQUAL TO OR LARGER THAN 1.5 mm AND SMALLER THAN 2.5 mm | EQUAL TO OR LARGER THAN 2.5 mm AND SMALLER THAN 3.5 mm | EQUAL TO OR LARGER THAN 3.5 mm |
| WORKABILITY | D | B | B | B |
| PRESSURE LOSS | A | A | B | C |
| THERMAL RESPONSIVENESS | A | A | B | C |
| COMPREHENSIVE DETERMINATION | D | A | B | C |

FIG. 14

| | AREA RATIO | | | | |
|---|---|---|---|---|---|
| | SMALLER THAN 0.1 | EQUAL TO OR LARGER THAN 0.1 AND SMALLER THAN 0.4 | EQUAL TO OR LARGER THAN 0.4 AND SMALLER THAN 0.7 | EQUAL TO OR LARGER THAN 1.0 AND SMALLER THAN 1.0 | LARGER THAN 1.0 |
| PRESSURE LOSS | D | C | B | A | A |
| WIND SPEED UNEVENNESS | A | B | B | C | D |
| COMPREHENSIVE DETERMINATION | D | B | A | B | D |

BLOWING UNIT, DRYING DEVICE, LIQUID APPLYING SYSTEM, AND PRINTING SYSTEM

CROSS-REFERENCE TO RELATED APPLICATION

The present application claims priority under 35 U.S.C § 119(a) to Japanese Patent Application No. 2021-103380 filed on Jun. 22, 2021, which is hereby expressly incorporated by reference, in its entirety, into the present application.

BACKGROUND OF THE INVENTION

1. Field of the Invention

The present invention relates to a blowing unit, a drying device, a liquid applying system, and a printing system.

2. Description of the Related Art

An ink jet printing apparatus that includes a drying device performing a drying process on a paper sheet, a film substrate, or the like on which a color image has been printed is known. Described in JP2002-292841A is an ink jet printer including a drying unit that dries ink landed on image receiving paper by means of hot air. The drying unit described in JP2002-292841A introduces air into a hollow casing having a rectangular parallelepiped shape and jets hot air via a plurality of jetting ports formed in the casing. A circular shape is applied to the plurality of jetting ports formed in a bottom surface of the casing and two-dimensional disposition is applied thereto.

SUMMARY OF THE INVENTION

However, although there is description in JP2002-292841A that any material having a sufficient heat resistance against jetted hot air can be used for the casing, there is no description about the structure of the casing for uniformly jetting hot air via the plurality of jetting ports. In addition, although there is description about drying uniformity in JP2002-292841A that a two-dimensional slit plate or the like described in JP1997-0133998A (JP-H9-0133998) can be applied, there is no description about the specific structure of the casing.

The present invention has been made in consideration of such circumstances and an object of the present invention is to provide a blowing unit, a drying device, a liquid applying system, and a printing system with which it is possible to realize uniformly blowing air via a plurality of jetting ports.

In order to achieve the above-described object, the following aspects of the invention are provided.

According to an aspect of the present disclosure, there is provided a blowing unit that has a hollow structure and blows air via a plurality of jetting ports disposed at a first surface. A gas inflow port through which a gas supplied from a gas supply source flows in is formed in a second surface which intersects the first surface and at which the jetting ports are not disposed and a ratio of a sum of opening areas of the plurality of jetting ports to an opening area of the gas inflow port is equal to or larger than 0.1 and equal to or smaller than 1.0.

In the case of the blowing unit according to the aspect of the present disclosure, the ratio of the sum of the opening areas of the plurality of jetting ports to the opening area of the gas inflow port through which the gas from the gas supply source is supplied is equal to or larger than 0.1 and equal to or smaller than 1.0. Accordingly, it is possible to realize uniformly blowing air via the plurality of jetting ports.

For the blowing unit, a columnar structure of which a bottom surface has a polygonal planar shape like a rectangular parallelepiped can be adopted.

The ratio of the sum of the opening areas of the plurality of jetting ports to the opening area of the gas inflow port is more preferably equal to or larger than 0.4 and equal to or smaller than 0.7.

For the jetting port, a through hole formed in the first surface that is flat can be applied. A circular shape can be applied as the opening shape of the jetting port.

In the blowing unit according to another aspect, the second surface may be brought into contact with a gas supply port disposition surface of the gas supply source at which a gas supply port is disposed so that the gas inflow port is bonded to the gas supply port.

According to such an aspect, the gas supply source can be disposed at a position near the blowing unit.

In the blowing unit according to another aspect, the blowing unit may be formed by using one kind of metal plate having a thickness equal to or larger than 1.5 mm and smaller than 3.5 mm.

According to such an aspect, it is possible to form a blowing unit preferable in terms of workability of a metal plate at the time of formation of the blowing unit, pressure loss in the blowing unit, and the thermal responsiveness of the blowing unit.

In the blowing unit according to another aspect, a plurality of the first surfaces may be provided.

According to such an aspect, air can be blown in a plurality of directions from one blowing unit. Accordingly, it is possible to compactly configure a drying unit in which the blowing unit is accommodated in comparison with a case where a plurality of blowing units that blow air in a plurality of directions respectively are provided.

In the blowing unit according to another aspect, two-dimensional disposition may be applied to disposition of the plurality of jetting ports at the first surface.

According to such an aspect, air can be blown two-dimensionally from the first surface.

In the blowing unit according to another aspect, a length of the blowing unit in a longitudinal direction may correspond to a length of any one side of a substrate to which air is blown.

According to such an aspect, it is possible to blow air to the entire surface of the substrate by causing the blowing unit and the substrate to which air is blown to scan each other once.

According to an aspect of the present disclosure, there is provided a drying device including a blowing unit that has a hollow structure and blows air via a plurality of jetting ports disposed at a first surface and a gas supply unit that supplies a gas to the blowing unit. The blowing unit is provided with a gas inflow port through which a gas supplied from a gas supply source flows in and that is formed in a second surface which intersects the first surface and at which the jetting ports are not disposed and a ratio of a sum of opening areas of the plurality of jetting ports to an opening area of the gas inflow port is equal to or larger than 0.1 and equal to or smaller than 1.0.

In the case of the drying device according to the aspect of the present disclosure, it is possible to achieve the same actions and effects as the blowing unit according to the above-described aspect of the present disclosure. The constituent requirements of the blowing unit according to another aspect can be applied to the drying device of a liquid applying system according to another aspect.

In the drying device according to another aspect, the gas supply unit may include a heat source and a fan motor that generates an air stream toward the heat source.

According to such an aspect, a drying process to which a heated gas is applied can be performed.

According to an aspect of the present disclosure, there is provided a liquid applying system including a liquid applying device that applies liquid to a substrate and a drying device that blows air to a substrate transport surface in a substrate transport path to dry the substrate to which the liquid has been applied. The drying device includes a blowing unit that has a hollow structure and blows air via a plurality of jetting ports disposed at a first surface and a gas supply unit that supplies a gas to the blowing unit, the blowing unit is provided with a gas inflow port through which a gas supplied from a gas supply source flows in and that is formed in a second surface which intersects the first surface and at which the jetting ports are not disposed, and a ratio of a sum of opening areas of the plurality of jetting ports to an opening area of the gas inflow port is equal to or larger than 0.1 and equal to or smaller than 1.0.

In the case of the liquid applying system according to the aspect of the present disclosure, it is possible to achieve the same actions and effects as the blowing unit according to the above-described aspect of the present disclosure. The constituent requirements of the blowing unit according to another aspect can be applied to the constituent requirements of the liquid applying system according to another aspect.

According to an aspect of the present disclosure, there is provided a printing system including a printing apparatus that prints an image on a substrate and a drying device that blows air to a substrate transport surface in a substrate transport path to dry the substrate on which the image has been printed. The drying device includes a blowing unit that has a hollow structure and blows air via a plurality of jetting ports disposed at a first surface and a gas supply unit that supplies a gas to the blowing unit, the blowing unit is provided with a gas inflow port through which a gas supplied from a gas supply source flows in and that is formed in a second surface which intersects the first surface and at which the jetting ports are not disposed, and a ratio of a sum of opening areas of the plurality of jetting ports to an opening area of the gas inflow port is equal to or larger than 0.1 and equal to or smaller than 1.0.

In the case of the printing system according to the aspect of the present disclosure, it is possible to achieve the same actions and effects as the blowing unit according to the above-described aspect of the present disclosure. The constituent requirements of the blowing unit according to another aspect can be applied to the constituent requirements of the printing system according to another aspect.

According to the aspects of the present disclosure, the ratio of the sum of the opening areas of the plurality of jetting ports to the opening area of the gas inflow port through which the gas from the gas supply source is supplied is equal to or larger than 0.1 and equal to or smaller than 1.0. Accordingly, it is possible to realize uniformly blowing air via the plurality of jetting ports.

BRIEF DESCRIPTION OF THE DRAWINGS

FIG. 13 is a table that shows evaluation results related to the thickness of a metal plate applied to a nozzle unit.

FIG. 14 is a table that shows evaluation results related to a structure applied to the nozzle unit.

DESCRIPTION OF THE PREFERRED EMBODIMENTS

Figure 1:
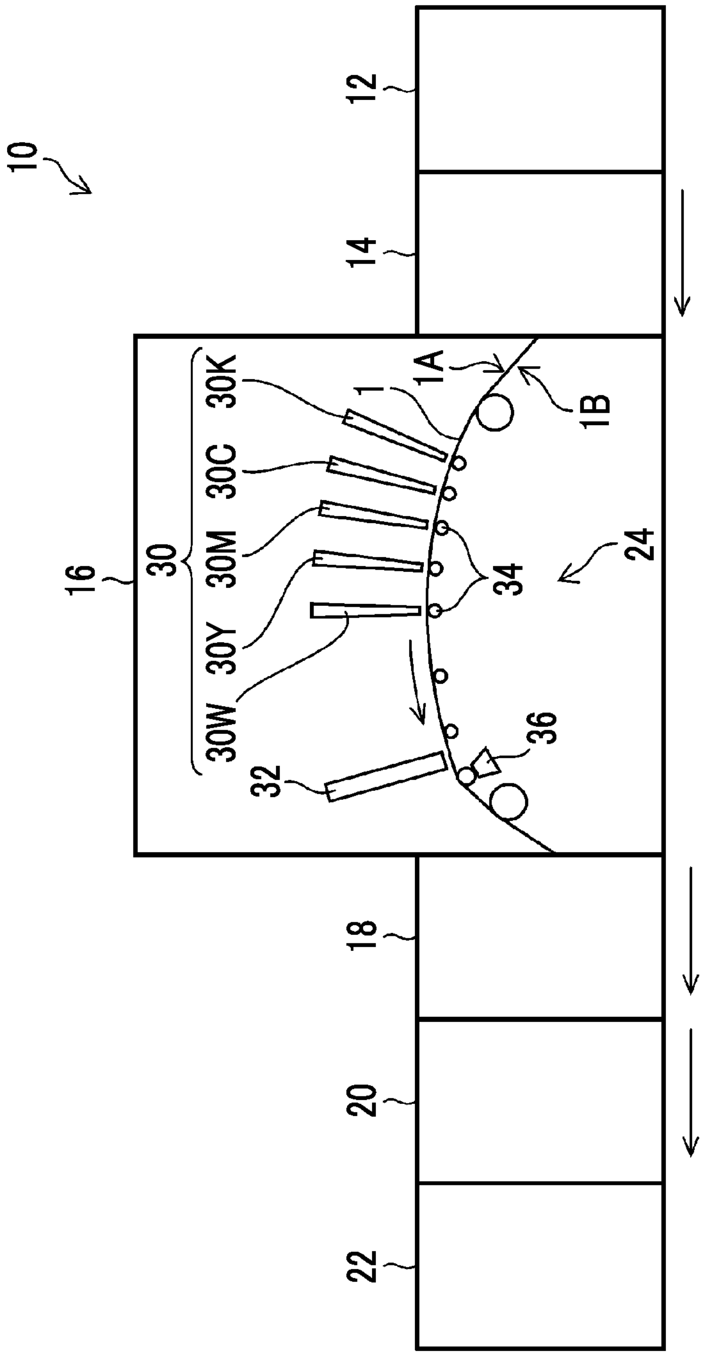
FIG. 1 is an entire configuration view of an ink jet printing system according to an embodiment.

Hereinafter, embodiments of the present invention will be described in detail with reference to the attached drawings. In the present specification, the same components will be given the same reference numerals and repetitive description thereof will be appropriately omitted.

Overall Configuration of Ink Jet Printing System

FIG. 1 is an entire configuration view of an ink jet printing system according to an embodiment. Arrow lines shown in the drawing represent a substrate transport direction, which is a transport direction of a film substrate 1 in each device provided in an ink jet printing system 10. The substrate transport direction is a direction in which the film substrate 1 proceeds.

The ink jet printing system 10 is a printing system to which a single-pass method is applied and prints a color image on a film substrate 1 by using aqueous color ink. The film substrate 1 is a transparent medium used for soft packaging and is an impermeable medium.

Examples of the film substrate 1 include oriented nylon (ONY), oriented polypropylene (OPP), and polyethylene terephthalate (PET). The ink jet printing system 10 creates a back-printed printed article visible from a substrate support surface 1B that is on a side opposite to a printing surface 1A with respect to the film substrate 1. The ink jet printing system 10 can also create a front-printed printed article visible from the printing surface 1A.

Being impermeable means being impermeable to aqueous primer and aqueous ink which will be described later. Soft packaging means packaging performed by using a material that is deformed depending on the shape of an article to be packaged. Being transparent means having a visible light transmittance equal to or higher than 30% and equal to or lower than 100%, preferably a visible light transmittance equal to or higher than 70% and equal to or lower than 100%.

The ink jet printing system 10 includes a paper feeding device 12, a pre-coating device 14, a jetting device 16, a drying device 18, an examination device 20, a recovery device 22, and a transport device 24. Hereinafter, each part will be described in detail.

Paper Feeding Device

A roll-to-roll transport method is applied to the ink jet printing system 10. The paper feeding device 12 includes a feed roll around which the film substrate 1 before printing of an image is wound. The feed roll includes a reel that is rotatably supported.

The paper feeding device 12 may include a corona treatment device that performs a reforming process on the printing surface 1A of the film substrate 1. The printing surface 1A of the film substrate 1 that has been subjected to the reforming process has a surface free energy suitable for an aqueous mixture of aqueous primer and aqueous ink and can secure a wettability suitable for the aqueous mixture. The film substrate 1 is transported to the pre-coating device 14.

Pre-Coating Device

The pre-coating device 14 is disposed at a position that is downstream of the paper feeding device 12 and upstream of the jetting device 16 in the substrate transport direction. The pre-coating device 14 applies pre-coating liquid to the printing surface 1A of the film substrate 1.

The pre-coating device 14 may include a pre-coating drying device. The pre-coating drying device dries the pre-coating liquid applied to the film substrate 1. As the pre-coating liquid, liquid such as aqueous primer liquid which contains a component that insolubilizes or thickens aqueous ink may be applied. The film substrate 1 to which the pre-coating liquid has been applied and on which the pre-coating liquid has been dried is transported to the jetting device 16. The pre-coating drying device may have the same configuration as the drying device which will be described later.

Jetting Device

The jetting device 16 includes an ink jet head 30K, an ink jet head 30C, an ink jet head 30M, an ink jet head 30Y, and an ink jet head 30W.

The ink jet head 30K, the ink jet head 30C, the ink jet head 30M, the ink jet head 30Y, and the ink jet head 30W jet black ink, cyan ink, magenta ink, yellow ink, and white ink, respectively. Hereinafter, in a case where it is not necessary to distinguish the ink jet head 30K and the like, the ink jet head 30K and the like will be described as the ink jet heads 30.

Aqueous ink jetted from the ink jet heads 30 is ink obtained by dissolving or dispersing a coloring material such as a pigment in a water-soluble solvent. As the pigment in the aqueous ink, an organic pigment is used. The viscosity of the aqueous ink is equal to or higher than 0.5 centipoises and equal to or lower than 5.0 centipoises.

The ink jet heads 30 jet color ink onto the printing surface 1A of the film substrate 1 transported by means of the transport device 24 to print a color image on the film substrate 1. White ink forms a white background image on the film substrate 1. A plurality of ink jet heads 30W for jetting aqueous white ink may be provided.

For the ink jet heads 30, disposition and orientation are applied such that nozzle surfaces from which ink is jetted are positioned and directed to face a substrate transport surface of a substrate transport path which is a transport path of the film substrate 1. The ink jet heads 30 are disposed at equal intervals along the substrate transport direction.

The ink jet heads 30 include a plurality of nozzles. Each nozzle may include a nozzle opening and an ink flow channel. An energy generating element is provided for each of the nozzles of the ink jet heads 30. Nozzle openings are two-dimensionally disposed in the nozzle surfaces of the ink jet heads 30. Water-repellent films are formed on the nozzle surfaces of the ink jet heads 30.

Piezoelectric elements may be applied as the energy generating elements. The ink jet heads 30 including the piezoelectric elements jet ink droplets via the nozzle openings by using bending deformation of the piezoelectric elements. Heaters may be applied as the energy generating elements. The ink jet heads 30 including the heaters jet ink droplets via the nozzle openings by using the film boiling phenomenon of ink.

As the ink jet heads 30, line-type heads, in each of which a plurality of nozzles are disposed over the entire length of the film substrate 1 in a substrate width direction, are applied. Note that, serial-type heads may be applied as the ink jet heads 30.

For the line-type ink jet heads 30, a structure in which a plurality of head modules are connected in the substrate width direction may be applied. The substrate width direction is a direction orthogonal to the substrate transport direction and is a direction parallel to a printing surface of the film substrate 1.

FIG. 1 shows a configuration in which aqueous ink of four colors are applied. However, the colors of ink are not limited to the four colors (black, cyan, magenta, and yellow). For example, a configuration in which ink of a light color such as light magenta and light cyan is applied and a configuration in which ink of a special color such as green, orange, violet, clear, and metallic is applied can also be applied. In addition, the order in which the ink jet heads for the respective colors are disposed is not limited to an example shown in FIG. 1.

The jetting device 16 includes a scanner 32. The scanner 32 includes an image pick-up device that images a test pattern image printed on the printing surface of the film substrate 1 and converts a captured image into an electric signal.

Examples of the image pick-up device include a CCD image sensor and a color CMOS image sensor. "CCD" is the abbreviation for "Charge Coupled Device". "CMOS" is the abbreviation for "Complementary Metal Oxide Semiconductor".

Figure 2:
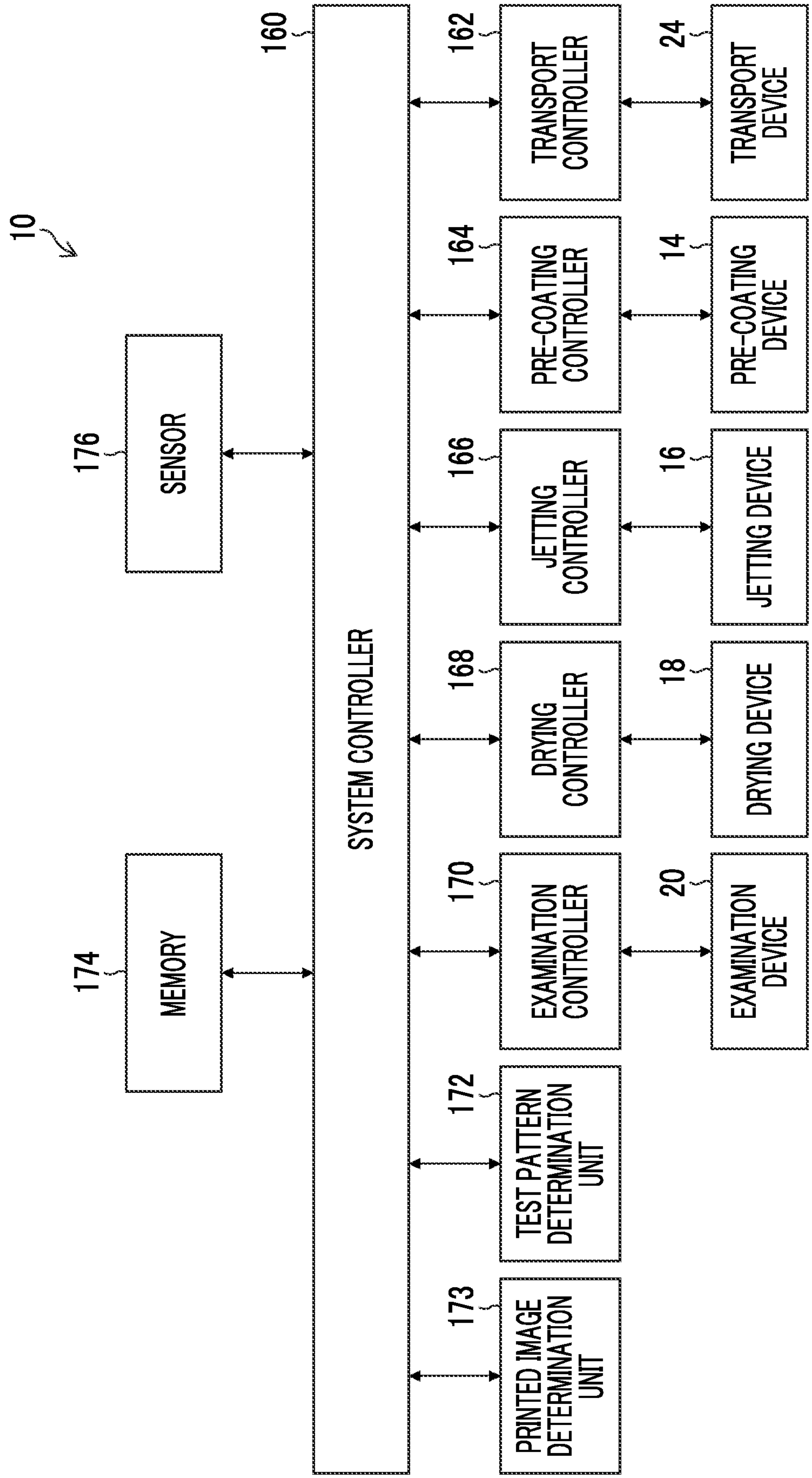
FIG. 2 is a functional block diagram showing an electric configuration of the ink jet printing system shown in FIG. 1.

Image pick-up data output from the scanner 32 is transmitted to a test pattern determination unit. The test pattern determination unit specifies a defective nozzle or the like based on the image pick-up data of a test pattern. The test pattern determination unit is shown in FIG. 2 with a reference numeral "172" given thereto.

The film substrate 1 from which the test pattern image has been captured by means of the scanner 32 is transported to the drying device 18.

Drying Device

The drying device 18 is disposed at a position that is downstream of the jetting device 16 in the substrate transport direction and upstream of the examination device 20 in the substrate transport direction. The drying device 18 includes a drying module that dries aqueous ink adhering to the printing surface 1A of the film substrate 1. The film substrate 1 after the drying of the aqueous ink is transported to the examination device 20. The details of the drying device will be described later.

Examination Device

The examination device 20 is disposed at a position that is downstream of the drying device 18 in the substrate transport direction and upstream of the recovery device 22 in the substrate transport direction. The examination device 20 examines whether or not there is a defect in an image printed on the film substrate 1.

The examination device 20 includes an imaging device that images an image printed on the film substrate 1 and an illumination device that irradiates the film substrate 1 with illumination light. Image pick-up data of the printed image is blown to a printed image determination unit. The printed image determination unit determines whether or not there is a defect in the printed image based on the image pick-up of the printed image. Note that the printed image determination unit is shown in FIG. 2 with a reference numeral "173" given thereto.

The film substrate 1 after examination of a captured image that is performed by means of the examination device 20 is transported to the recovery device 22.

Recovery Device

The recovery device 22 recovers the film substrate 1 on which an image has been printed. Specifically, the film substrate 1 on which the image has been printed is wound onto a winding roll.

Transport Device

A roll-to-roll method is applied to the transport device 24. The transport device 24 transports the film substrate 1 from the paper feeding device 12 to the recovery device 22 along the substrate transport path in the substrate transport direction in this order: the paper feeding device 12, the pre-coating device 14, the jetting device 16, the drying device 18, the examination device 20, and the recovery device 22. The paper feeding device 12 and the recovery device 22 may be included in the transport device 24.

The transport device 24 includes a plurality of pass rollers 34. One or more pass rollers 34 are disposed in each of the paper feeding device 12, the pre-coating device 14, the jetting device 16, the drying device 18, the examination device 20, and the recovery device 22.

The transport device 24 includes tension pickups 36, and one or more tension pickups 36 are disposed in each of the paper feeding device 12, the pre-coating device 14, the jetting device 16, the drying device 18, the examination device 20, and the recovery device 22. The tension pickups 36 detect tension applied to the film substrate 1. A detection signal of the tension pickups 36 is blown to a transport controller. Note that the transport controller is shown in FIG. 2 with a reference numeral "162" given thereto. In FIG. 1, the tension pickup 36 provided in the jetting device 16 is shown and the tension pickups 36 provided in the paper feeding device 12 and the like are not shown.

Electric Configuration of Ink Jet Printing System

FIG. 2 is a functional block diagram showing an electric configuration of the ink jet printing system shown in FIG. 1. The ink jet printing system 10 includes a system controller 160, the transport controller 162, a pre-coating controller 164, a jetting controller 166, a drying controller 168, an examination controller 170, the test pattern determination unit 172, and the printed image determination unit 173.

The system controller 160 comprehensively controls the overall operation of the ink jet printing system 10. The system controller 160 transmits command signals to various controllers. The system controller 160 functions as a memory controller that controls the storing of data in a memory 174 and the reading of data from the memory 174.

The system controller 160 acquires a sensor signal transmitted from a sensor 176 and transmits command signals based on the sensor signal to various controllers. The sensor 176 shown in FIG. 2 includes the tension pickup 36 shown in FIG. 1. In addition, the sensor 176 includes a position detection sensor, a temperature sensor, and the like provided in each part of the ink jet printing system 10.

The transport controller 162 sets transport conditions based on the command signal transmitted from the system controller 160 and controls the operation of the transport device 24 based on the set transport conditions. For example, the transport controller 162 applies transport conditions applied to the transport device 24 to control the operation of a motor connected to a drive roller or the like provided in the transport device 24.

In addition, the transport controller 162 individually controls transport tension applied to the film substrate 1 in each of sections such as the pre-coating device 14 and the jetting device 16 provided in the ink jet printing system 10. That is, the transport controller 162 controls transport tension of the film substrate 1 in each section over an area from the paper feeding device 12 to the recovery device 22.

The pre-coating controller 164 sets pre-coating process conditions based on the command signal transmitted from the system controller 160 and controls the operation of the pre-coating device 14 based on the set pre-coating process conditions.

The jetting controller 166 sets printing conditions based on the command signal transmitted from the system controller 160 and controls the operation of the jetting device 16 based on the set printing conditions.

The jetting controller 166 includes an image processing unit that performs a color decomposition process, a color conversion process, a correction process for each process, and a halftone process with respect to printing data to generate halftone data based on the printing data.

The jetting controller 166 includes a drive voltage generation unit that generates a drive voltage to be supplied to the ink jet heads 30. The jetting controller 166 includes a drive voltage output unit that supplies the drive voltage to the ink jet heads 30.

The drying controller 168 sets process conditions for a drying process applied to the drying device 18 based on the command signal transmitted from the system controller 160 and controls the operation of the drying device 18 based on the set drying process conditions.

The examination controller 170 sets examination conditions applied to the examination device 20 based on the command signal transmitted from the system controller 160 and controls the operation of the examination device 20 based on the set examination conditions.

The test pattern determination unit 172 acquires image pick-up data of a test pattern and analyzes the image pick-up data of the test pattern. The test pattern determination unit 172 determines whether or not there is a jetting abnormality of the ink jet heads 30 based on the result of the analysis.

The printed image determination unit 173 acquires image pick-up data of a printed image and analyzes the image pick-up data of the printed image. The printed image determination unit 173 determines whether or not there is an image defect in the printed image based on the result of the analysis.

Figure 3:
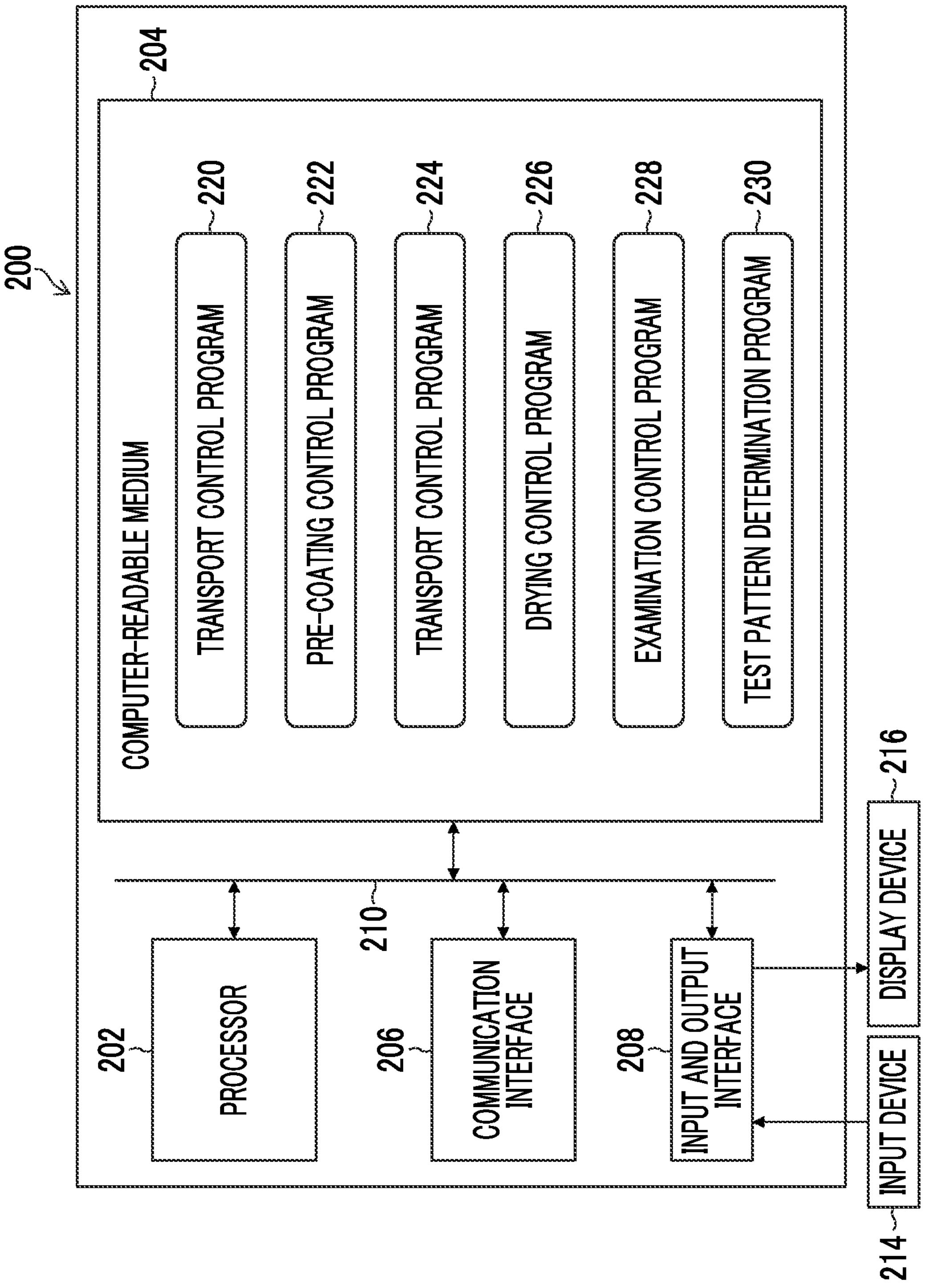
FIG. 3 is a block diagram showing a configuration example of the hardware of the electric configuration shown in FIG. 2.

FIG. 3 is a block diagram showing a configuration example of the hardware of the electric configuration shown in FIG. 2. A control device 200 included in the ink jet printing system 10 includes a processor 202, a non-temporary tangible computer-readable medium 204, a communication interface 206, and an input and output interface 208.

A computer is applied as the control device 200. The form of the computer may be a server, a personal computer, a workstation, a tablet terminal, or the like.

The processor 202 includes a central processing unit (CPU). The processor 202 may include a graphics processing unit (GPU). The processor 202 is connected to the computer-readable medium 204, the communication interface 206, and the input and output interface 208 via a bus 210. An input device 214 and a display device 216 are connected to the bus 210 via the input and output interface 208.

The computer-readable medium 204 includes a memory as a main memory and a storage as an auxiliary storage. A semiconductor memory, a hard disk apparatus, a solid state drive device, or the like can be applied as the computer-readable medium 204. Any combination of a plurality of devices may be applied as the computer-readable medium 204.

The hard disk device may be referred to as an HDD, which is the abbreviation for “Hard Disk Drive” in English. The solid state drive device may be referred to as SSD, which is the abbreviation for “Solid State Drive” in English.

The control device 200 is connected to a network via the communication interface 206 and is connected to an external device such that communication can be performed. As the network, a local area network (LAN) or the like may be applied. The network is not shown.

The computer-readable medium 204 stores a transport control program 220, a pre-coating control program 222, a jetting control program 224, a drying control program 226, an examination control program 228, and a test pattern determination program 230.

The transport control program 220 corresponds to transport control applied to the transport device 24 shown in FIG. 2. The pre-coating control program 222 corresponds to pre-coating control applied to the pre-coating device 14.

The jetting control program 224 corresponds to printing control applied to the jetting device 16. The drying control program 226 corresponds to drying control applied to the drying device 18.

The examination control program 228 corresponds to printed image examination applied to the examination device 20. The test pattern determination program 230 is applied to jetting abnormality determination based on the image pick-up data of the test pattern.

The various programs stored in the computer-readable medium 204 include one or more instructions. The computer-readable medium 204 stores various data, various parameters, and the like. The memory 174 shown in FIG. 2 is included in the computer-readable medium 204 shown in FIG. 3.

In the ink jet printing system 10, the processor 202 executes the various programs stored in the computer-readable medium 204 to realize various functions in the ink jet printing system 10. Note that the term “program” has the same meaning as “software”.

The control device 200 performs data communication with the external device via the communication interface 206. Various standards such as universal serial bus (USB) can be applied to the communication interface 206. Any of wired communication or wireless communication may be applied as the way in which the communication interface 206 performs communication.

The input device 214 and the display device 216 are connected to the control device 200 via the input and output interface 208. An input device such as a keyboard and a mouse is applied as the input device 214. Various kinds of information applied to the control device 200 are displayed by the display device 216.

A liquid crystal display, an organic EL display, a projector, or the like may be applied as the display device 216. Any combination of a plurality of devices may be applied as the display device 216. “EL” of the organic EL display is the abbreviation for “Electro-Luminescence”.

Here, examples of the hardware structure of the processor 202 include a CPU, a GPU, a programmable logic device (PLD), and an application specific integrated circuit (ASIC). The CPU is a general-purpose processor that executes a program to act as various functional units. The GPU is a processor specialized in image processing.

The PLD is a processor that can change the configuration of an electric circuit after manufacture of a device. Examples of the PLD include a field programmable gate array (FPGA). The ASIC is a processor with a dedicated electric circuit specifically designed to perform a specific process.

One processing unit may be composed of one of these various processors or may be composed of two or more processors of the same type or different types. Examples of a combination of various processors include a combination of one or more FPGAs and one or more CPUs and a combination of one or more FPGAs and one or more GPUs. Another example of a combination of various processors is a combination of one or more CPUs and one or more GPUs.

A plurality of functional units may be configured by using one processor. Examples of a configuration in which a plurality of functional units are configured by using one processor include a configuration in which a combination of one or more CPUs and software like a System-On-a-Chip (SoC) that is represented by a computer such as a client or a server is applied to configure one processor and the processor acts as a plurality of functional units.

Another example of a configuration in which a plurality of functional units are configured by using one processor is a configuration in which a processor that uses one IC chip to realize the functions of the entire system including a plurality of functional units is used. Note that “IC” is the abbreviation for “Integrated Circuit”.

As described above, various functional units are configured by using one or more of the above-mentioned various processors as the hardware structure. Furthermore, the hardware structure of the various processors described above is, more specifically, an electric circuit (circuitry) in which circuit elements such as semiconductor elements are combined with each other.

The computer-readable medium 204 may include a semiconductor element such as a read only memory (ROM) and a random access memory (RAM). The computer-readable medium 204 may include a magnetic storage medium such as a hard disk. The computer-readable medium 204 may include a plurality of types of storage media.

The ink jet printing system 10 described in the embodiment is an example of a liquid applying system. The pre-coating device 14 and the jetting device 16 according to the embodiment are examples of a liquid applying device.

Detailed Description of Drying Device

First Embodiment

Figure 4:
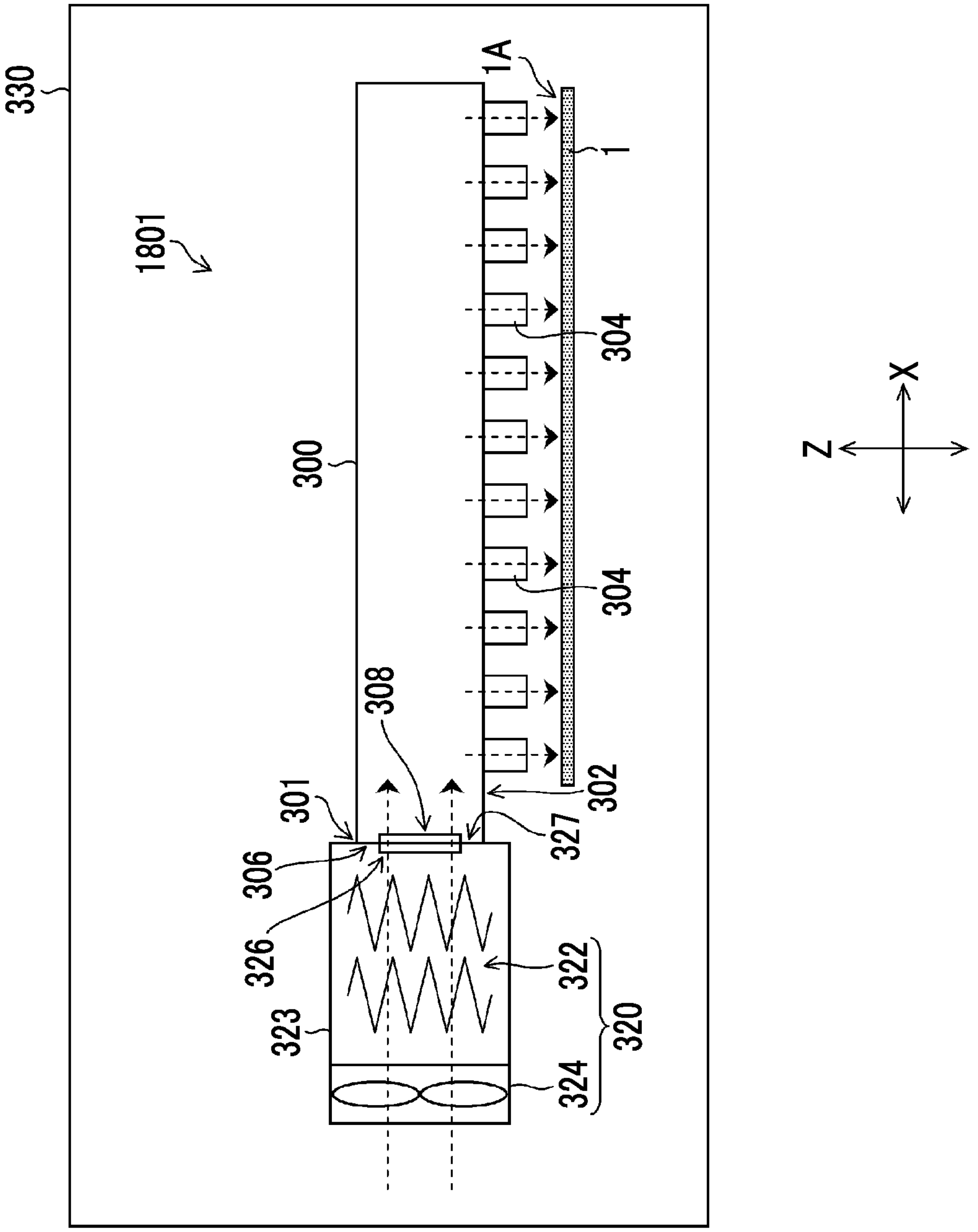
FIG. 4 is a front view showing a configuration example of a drying module according to a first embodiment.

FIG. 4 is a front view showing a configuration example of a drying module according to a first embodiment. The reference numeral “X” shown in FIG. 4 represents the substrate width direction. In addition, the reference numeral "Z" represents a vertically upward direction. The same applies to the reference numerals "X" and "Z" shown in FIGS. 5 to 9.

A drying module 1801 includes a nozzle unit 300 and a heater unit 320. The drying module 1801 generates a heated gas of which the temperature falls in a predetermined range in the heater unit 320 which is a component different from the nozzle unit 300 and supplies the heated gas to the nozzle unit 300. Air may be applied as the heated gas.

The heater unit 320 is disposed at a non-facing position of the substrate transport path at which the heater unit 320 does not face the substrate transport path. In addition, the heater unit 320 is disposed at a position near the nozzle unit 300. Accordingly, a reduction in pressure loss of the heated gas and a reduction in heat loss of the heated gas are realized. The heater unit 320 shown in FIG. 4 is bonded to a side surface 306 which is an end 301 of the nozzle unit 300 that is on one side in substrate width direction.

Although FIG. 4 shows a configuration in which the side surface 306 of the nozzle unit 300 and a gas supply port disposition surface 327, which is an end of the heater unit 320 that is on one side in the substrate width direction, are bonded to each other, the nozzle unit 300 and the heater unit 320 may be bonded to each other via a duct or the like having such a length that the flow of the heated gas is not influenced.

The nozzle unit 300 has a structure that realizes uniform supply of the heated gas to a plurality of nozzles 304, so that uniform supply of heat to the plurality of nozzles 304 is automatically achieved. Note that uniformity mentioned here may include a variation within a prescribed miscalculation range.

Figure 7:
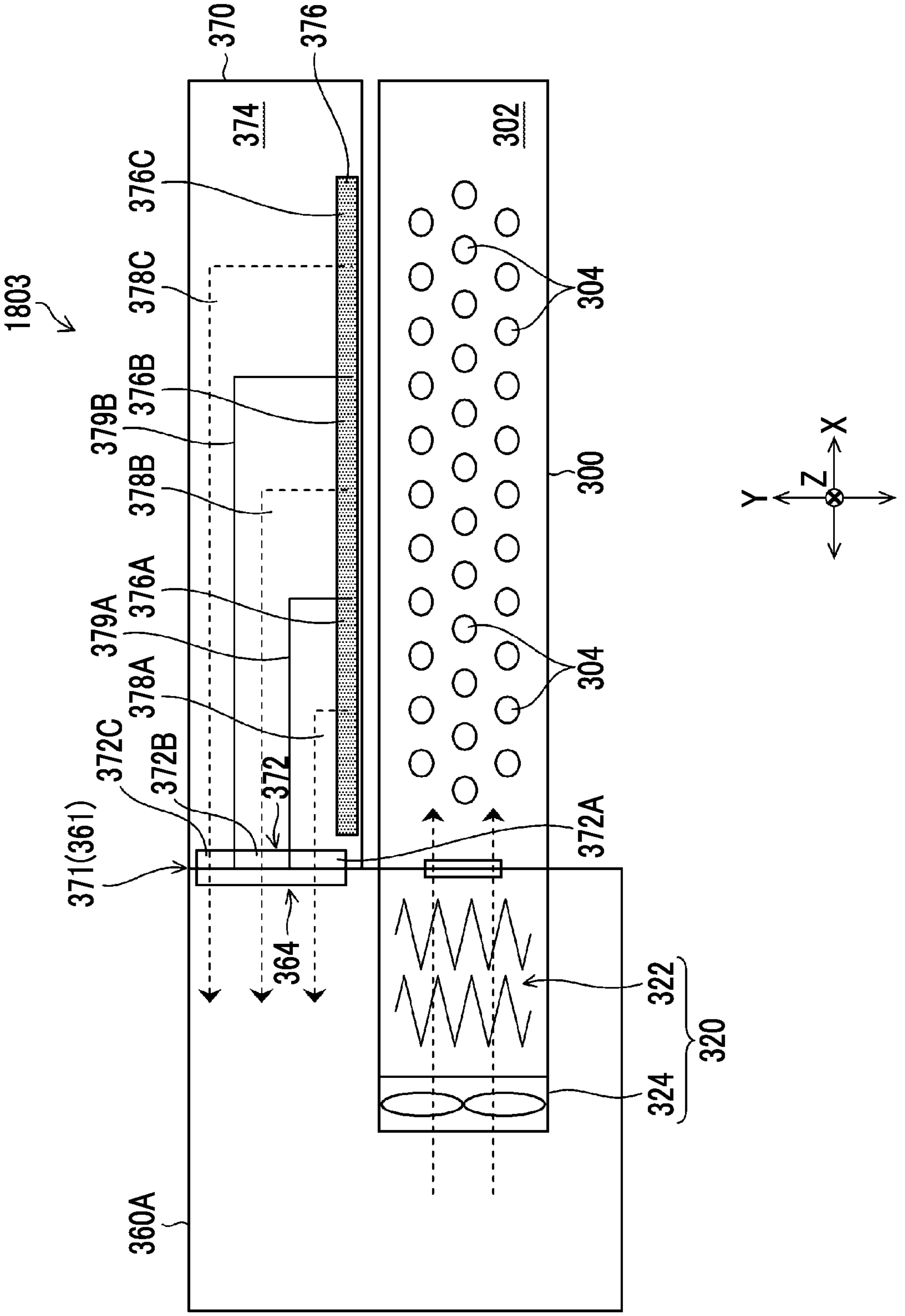
FIG. 7 is a bottom view showing a configuration example of a drying module according to a third embodiment.

The nozzle unit 300 has a rectangular parallelepiped shape and has a length exceeding the total length of the film substrate 1 in the substrate width direction. In the nozzle unit 300, the plurality of nozzles 304 are disposed at a nozzle disposition surface 302 that faces the substrate transport surface. The plurality of nozzles 304 are disposed over a length exceeding the total length of one side of the film substrate 1 in the substrate width direction. Examples of the disposition of the plurality of nozzles 304 at the nozzle disposition surface 302 include two-dimensional disposition. An example of the two-dimensional disposition of the plurality of nozzles 304 is shown in FIG. 7.

Note that the substrate width direction described in the embodiment is an example of the longitudinal direction of the blowing unit. The total length of one side of the film substrate 1 in the substrate width direction described in the embodiment is an example of the length of any one side of a substrate. The film substrate 1 described in the embodiment is an example of a substrate to which air is sent.

Each nozzle 304 has a protruding shape protruding from the nozzle disposition surface 302 and a nozzle opening is formed at a distal end thereof. The nozzles 304 blow the heated gas, which is a gas subjected to heating, toward the printing surface 1A of the film substrate 1 via the nozzle openings. Downward arrow lines near the nozzles 304 represent a direction in which the heated gas is blown. Note that the blowing of the heated gas is the same concept as the jetting, the blasting, the releasing, and the like of the heated gas.

Although FIG. 4 shows the nozzles 304 each having the protruding shape protruding from the nozzle disposition surface 302, openings formed in the nozzle disposition surface 302 may be applied as the nozzles 304. Any shape such as a circular shape and a quadrangular shape is applied to the planar shape of each nozzle opening.

Regarding the nozzle unit 300, a through hole serving as a heated gas inflow port 308 through which the heated gas is supplied is formed in the side surface 306 that is orthogonal to the nozzle disposition surface 302 and that is parallel to the substrate transport direction. The heated gas generated in the heater unit 320 flows into the nozzle unit 300 via the heated gas inflow port 308. Any shape such as a circular shape and a quadrangular shape is applied to the planar shape of the heated gas inflow port 308.

Note that the nozzle disposition surface 302 described in the embodiment is an example of a first surface. The side surface 306 described in the embodiment is an example of a second surface that intersects a first surface and is an example of the second surface at which no jetting port is disposed. Each of the nozzles 304 described in the embodiment is an example of a jetting port.

The heater unit 320 includes a heater 322 and an axial fan 324. The heater 322 and the axial fan 324 are disposed in the order of the heater 322 and the axial fan 324 in a direction away from the heated gas inflow port 308.

The heater 322 heats air, which is a gas in the vicinity of the heater 322, based on a prescribed set temperature. An infrared heater or the like may be applied as the heater 322. The axial fan 324 blows air toward the heater 322 based on prescribed blowing conditions to generate a heated gas. Rightward arrow lines shown in FIG. 4 represent a direction in which the axial fan 324 blows air.

The heater unit 320 includes a heated gas supply port 326 at a position corresponding to the heated gas inflow port 308 of the nozzle unit 300. The heated gas supply port 326 is formed in the gas supply port disposition surface 327 of a heater case 323 in which the heater 322 is provided. The opening shape and the opening area of the heated gas supply port 326 correspond to the heated gas inflow port 308. For example, the heated gas supply port 326 may have the same shape and size as the heated gas inflow port 308.

The drying module 1801 has a structure in which the side surface 306 of the nozzle unit 300 and the gas supply port disposition surface 327 of the heater unit 320 are in contact with each other and the heated gas inflow port 308 of the nozzle unit 300 and the heated gas supply port 326 of the heater unit 320 are bonded to each other.

The drying module 1801 including the nozzle unit 300 and the heater unit 320 is disposed inside a drying furnace 330. The drying furnace 330 includes a transport path for the film substrate 1 on which a drying process is performed by means of the drying module 1801.

According to such an embodiment, it is possible to realize a reduction in heat loss in the entire drying module 1801. For example, in consideration of an influence on the lifespan or the like of the axial fan 324, the drying module 1801 may be disposed inside the drying furnace 330 in a case where a relatively low heating temperature is applied.

Note that, the drying furnace 330 described in the embodiment is an example of a drying unit. The nozzle unit 300 described in the embodiment is an example of a blowing unit. The heater unit 320 described in the embodiment is an example of a heated gas supply unit and is an example of a gas supply source and a gas supply unit. In addition, the heater 322 described in the embodiment is an example of a heat source. The axial fan 324 described in the embodiment is an example of a fan motor.

Figure 5:
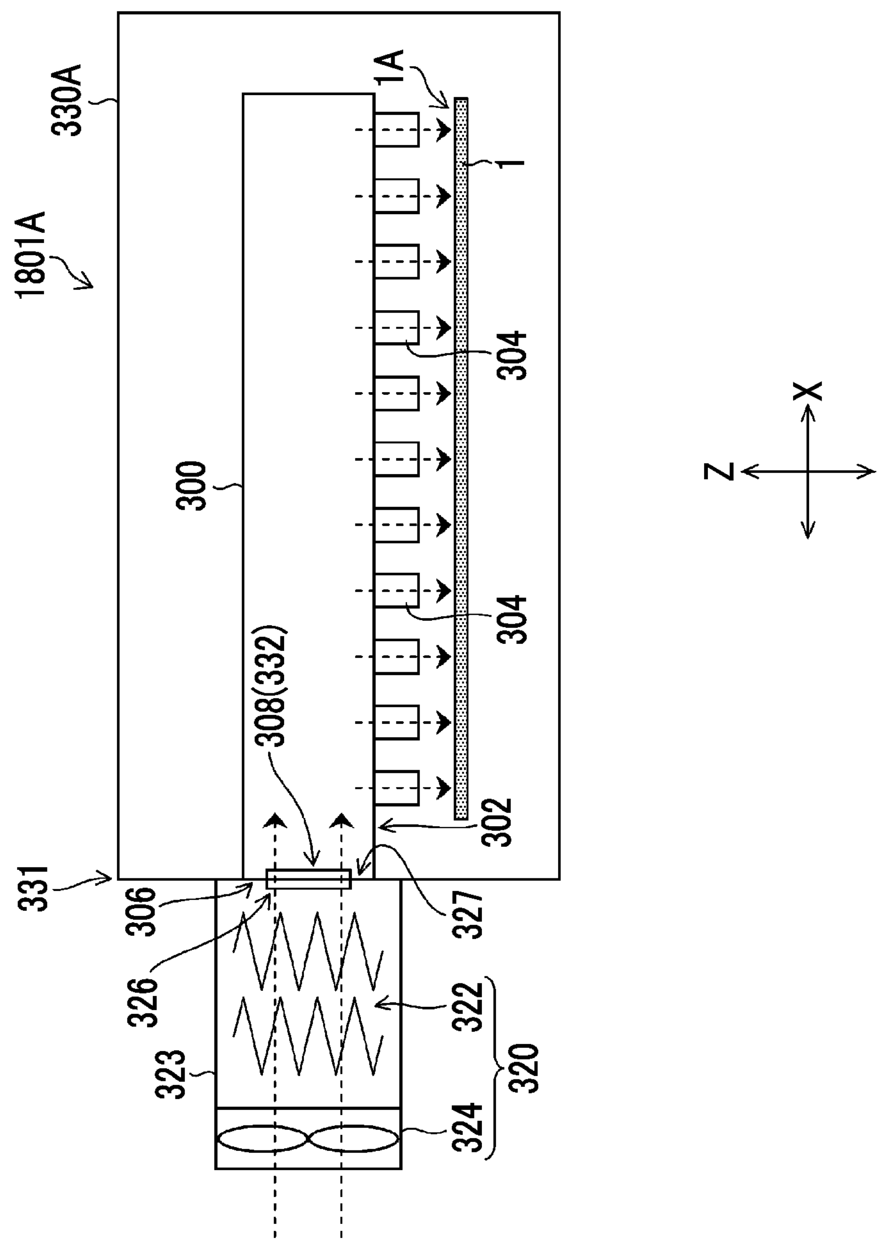
FIG. 5 is a front view showing a modification example of the drying module shown in FIG. 4.

FIG. 5 is a front view showing a modification example of the drying module shown in FIG. 4. In the case of a drying module 1801A according to the modification example, the nozzle unit 300 is disposed inside a drying furnace 330A and the heater unit 320 is disposed outside the drying furnace 330A.

That is, an opening 332 that has a size corresponding to the heated gas inflow port 308 and that is disposed corresponding to the heated gas inflow port 308 is formed in the drying furnace 330A. An end surface 331 of the drying furnace 330A that is on one side in the substrate width direction is bonded to the heater unit 320 with the opening 332 and the heated gas supply port 326 being positionally aligned with each other.

With the drying module 1801A according to the modification example, maintenance such as replacement of the heater unit 320 can be efficiently performed. The drying furnace 330A described in the embodiment is an example of a drying unit.

Second Embodiment

Figure 6:
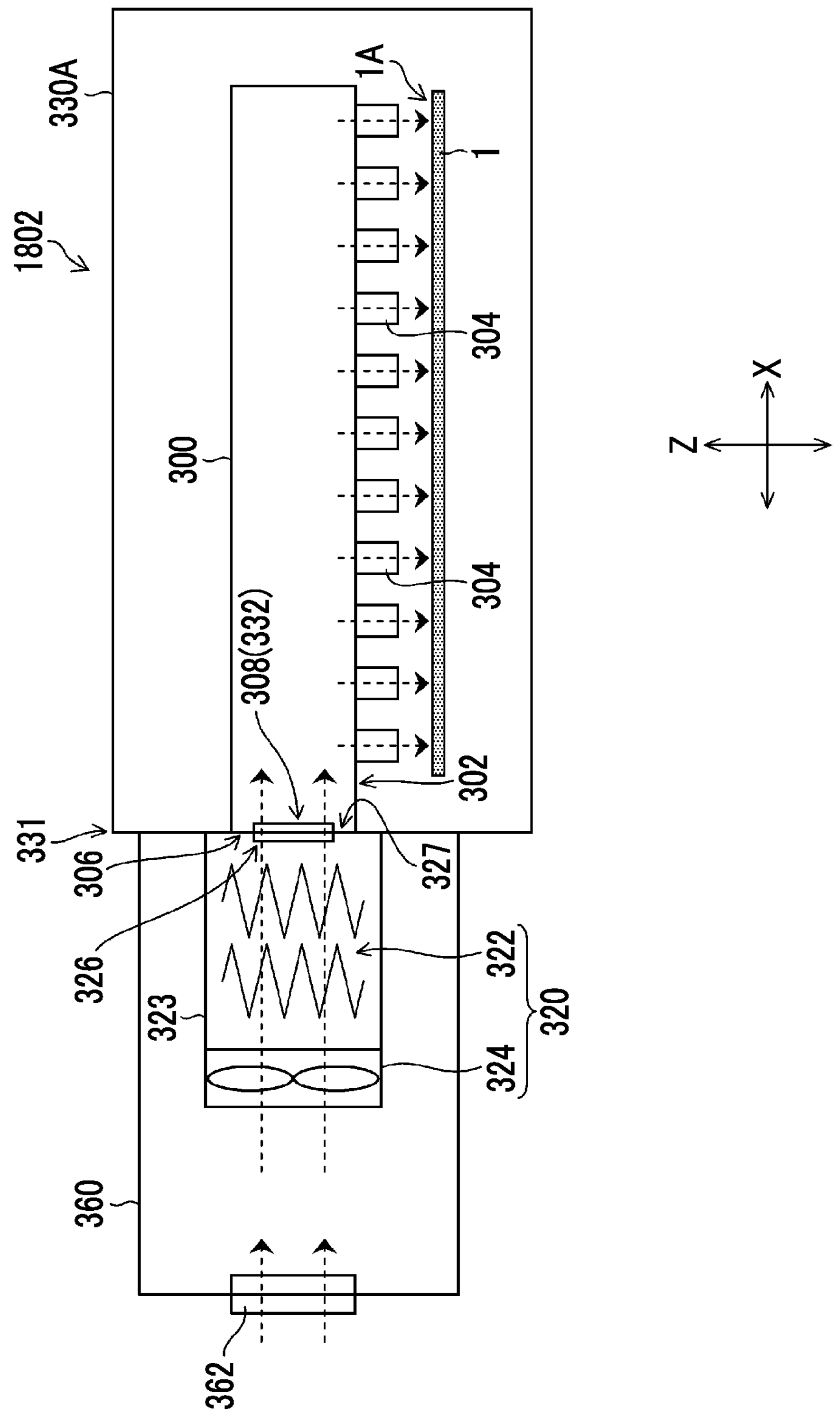
FIG. 6 is a plan view showing a configuration example of a drying module according to a second embodiment.

FIG. 6 is a plan view showing a configuration example of a drying module according to a second embodiment. A drying module 1802 according to the second embodiment includes a circulation structure that recycles the heated gas generated in the heater unit 320.

The heater unit 320 shown in FIG. 6 is disposed outside the drying furnace 330A. The heater 322 and the axial fan 324 constituting the heater unit 320 are accommodated inside a heated gas generation box 360. Accordingly, the axial fan 324 can blow the heated gas in the heated gas generation box 360 to the nozzle unit 300 without escape of thermal energy generated by the heater 322 from the heated gas generation box 360.

The heated gas generation box 360 includes a first intake port 362 through which outside air is taken in. The first intake port 362 may be disposed at any of surfaces constituting the heated gas generation box 360. FIG. 6 shows a configuration in which the first intake port 362 is disposed at a surface that faces an intake surface of the axial fan 324.

Third Embodiment

Figure 8:
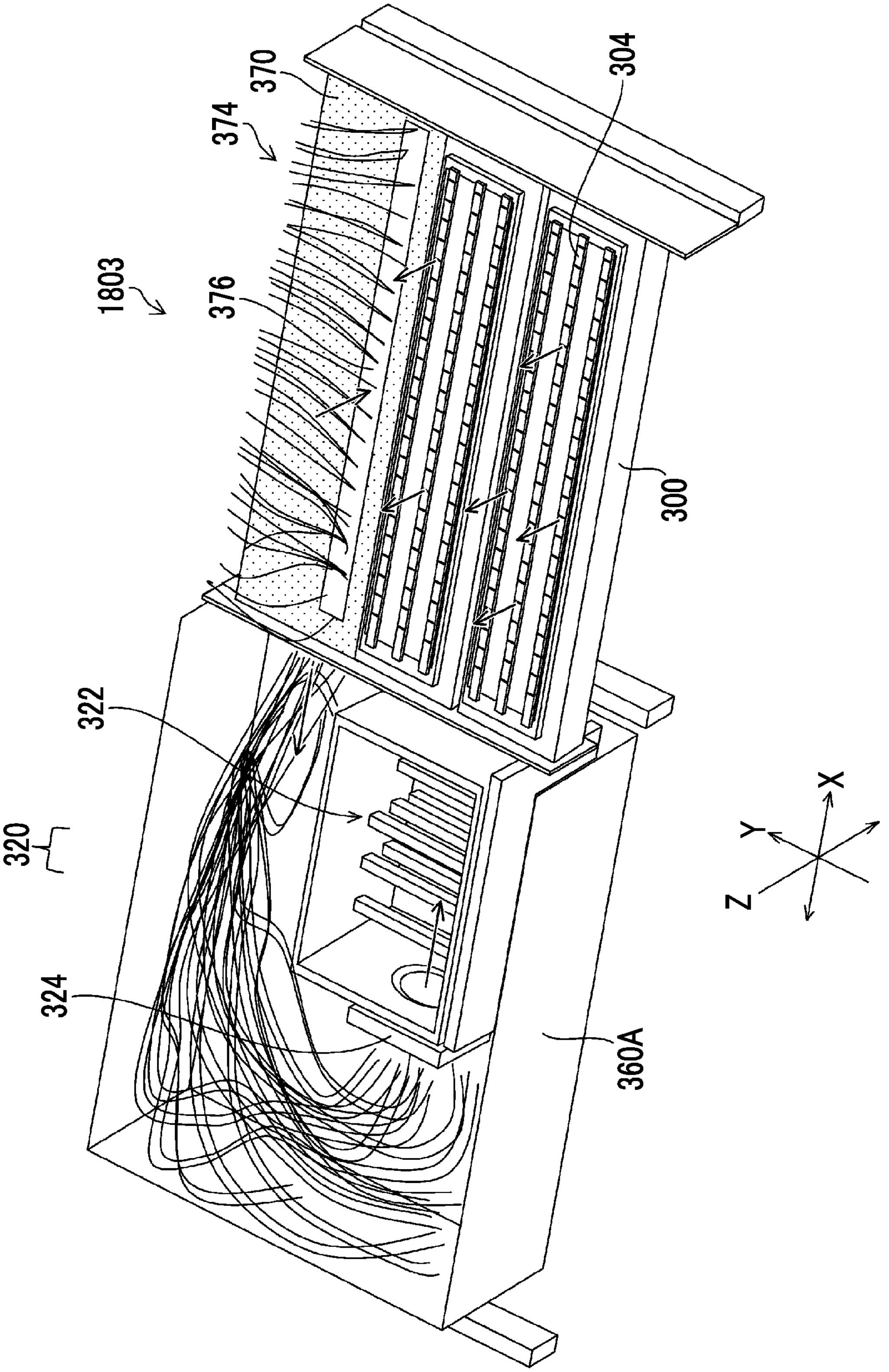
FIG. 8 is a perspective view showing an internal structure example of the drying module shown in FIG. 7.

FIG. 7 is a bottom view showing a configuration example of a drying module according to a third embodiment. FIG. 8 is a perspective view showing an internal structure example of the drying module shown in FIG. 7. FIGS. 7 and 8 are views of a drying module 1803 viewed as seen in a vertical direction from a lower side to an upper side.

Note that in FIGS. 7 and 8, a drying furnace into which the nozzle unit 300 is built is not shown. In addition, reference numerals "X", "Y", and "Z" shown in FIGS. 7 and 8 represent the substrate width direction, the substrate transport direction in the drying module 1803, and a vertically upward direction, respectively.

In the case of the drying module 1803, a heated gas recovery unit 370 is disposed downstream of the nozzle unit 300 in the substrate transport direction. A heated gas discharge port 372 through which the heated gas is discharged is formed in an end surface 371 of the heated gas recovery unit 370 that is on one side in the substrate width direction. Note that the heated gas discharge port 372 is not shown in FIG. 8.

Regarding the heated gas recovery unit 370, a heated gas recovery port 376 is formed in a substrate facing surface 374 that faces the substrate transport surface. The heated gas recovery port 376 has a rectangular planar shape and the length thereof in the substrate width direction corresponds to a length by which the nozzles 304 are disposed.

A second intake port 364 is formed in an edge surface 361 of a heated gas generation box 360A that is on the other side in the substrate width direction. The second intake port 364 is disposed at a position corresponding to the heated gas discharge port 372 and the opening shape and the size thereof corresponds to the heated gas discharge port 372. For example, the second intake port 364 may have the same shape and size as the heated gas discharge port 372.

In a case where the edge surface 371 of the heated gas recovery unit 370 that is on the one side and the edge surface 361 of the heated gas generation box 360 that is on the other side are brought into contact with each other and are bonded to each other, the second intake port 364 and the heated gas discharge port 372 are positionally aligned with each other.

In the case of the drying module 1803 having such a structure, the heated gas blown from the nozzle unit 300 is recovered to the heated gas recovery unit 370 via the heated gas recovery port 376. The heated gas recovered to the heated gas recovery unit 370 is recovered to the heated gas generation box 360A via the heated gas discharge port 372 and the second intake port 364.

Accordingly, thermal energy circulation in which a high-temperature heated gas present in a drying furnace into which the nozzle unit 300 and the heated gas recovery unit 370 are built is taken into the heated gas generation box 360A is realized and thus it is possible to achieve a power saving effect with the drying module 1803.

The axial fan 324 functions as an air stream generating source at the time of circulation of the heated gas from the heated gas generation box 360A to the heated gas generation box 360A via the nozzle unit 300 and the heated gas recovery unit 370.

FIG. 7 shows a rectangular parallelepiped shape and a hollow structure as examples of the shape and the structure of the heated gas recovery unit 370. The heated gas recovery unit 370 may be disposed upstream of the nozzle unit 300 in the substrate transport direction.

As shown in FIG. 7, the heated gas recovery port 376 is divided into three parts in the substrate width direction which is a longitudinal direction of the heated gas recovery unit 370. That is, the heated gas recovery port 376 is divided into a first intake region 376A, a second intake region 376B, and a third intake region 376C.

The heated gas recovery unit 370 includes a first intake flow channel 378A communicating with the first intake region 376A, a second intake flow channel 378B communicating with the second intake region 376B, and a third intake flow channel 378C communicating with the third intake region 376C.

That is, the heated gas recovery unit 370 includes a first partition wall 379A that separates the first intake flow channel 378A and the second intake flow channel 378B from each other and a second partition wall 379B that separates the second intake flow channel 378B and the third intake region 376C from each other.

The heated gas discharge port 372 is divided into a first discharge region 372A connected to the first intake flow channel 378A, a second discharge region 372B connected to the second intake flow channel 378B, and a third discharge region 372C connected to the third intake flow channel 378C.

The heated gas sucked from the first intake region 376A is recovered to the heated gas generation box 360A via the first intake flow channel 378A and the first discharge region 372A. Further, the heated gas sucked from the second intake region 376B is recovered to the heated gas generation box

360A via the second intake flow channel 378B and the second discharge region 372B.

Furthermore, the heated gas sucked from the third intake region 376C is recovered to the heated gas generation box 360A via the third intake flow channel 378C and the third discharge region 372C.

Note that, in FIG. 7, arrow lines given to the first intake flow channel 378A, the second intake flow channel 378B, and the third intake flow channel 378C schematically represent the heated gas recovered to the heated gas generation box 360A via the heated gas recovery port 376. In addition, in FIG. 8, a plurality of curved lines are used to schematically represent the flow of the heated gas and arrow lines are used to represent a direction in which the heated gas flows as a whole.

In a case where a gas is taken into the heated gas recovery unit 370 via the heated gas recovery port 376, the amount of suction per unit period tends to be relatively large at a first intake region 376A side, which is a side close to the axial fan 324, in comparison with a second intake region 376B side, which is a side far from the axial fan 324. Therefore, the heated gas discharge port 372 is divided into a plurality of regions and the first intake flow channel 378A or the like which is a heated gas flow channel is provided for each region.

Accordingly, a variation in amount of intake per unit period in the substrate width direction is suppressed in the case of an intake performed via the heated gas recovery port 376 and thus an intake uniform in the substrate width direction is realized. The number of regions into which the heated gas recovery port 376 is divided and the number of regions into which the heated gas discharge port 372 is divided are not limited to numbers as in an example shown in FIG. 7 and any number may be applied as the numbers.

Note that the first intake region 376A, the second intake region 376B, and the third intake region 376C described in the embodiment are an example of a plurality of intake regions of a heated gas recovery port partitioned in a longitudinal direction thereof.

In addition, the first discharge region 372A, the second discharge region 372B, and the third discharge region 372C described in the embodiment are an example of a plurality of discharge regions of a heated gas discharge port partitioned corresponding to a plurality of intake regions.

Furthermore, each of the first intake flow channel 378A, the second intake flow channel 378B, and the third intake flow channel 378C described in the embodiment is an example of an intake flow channel constituting a plurality of intake flow channels.

Fourth Embodiment

Figure 9:
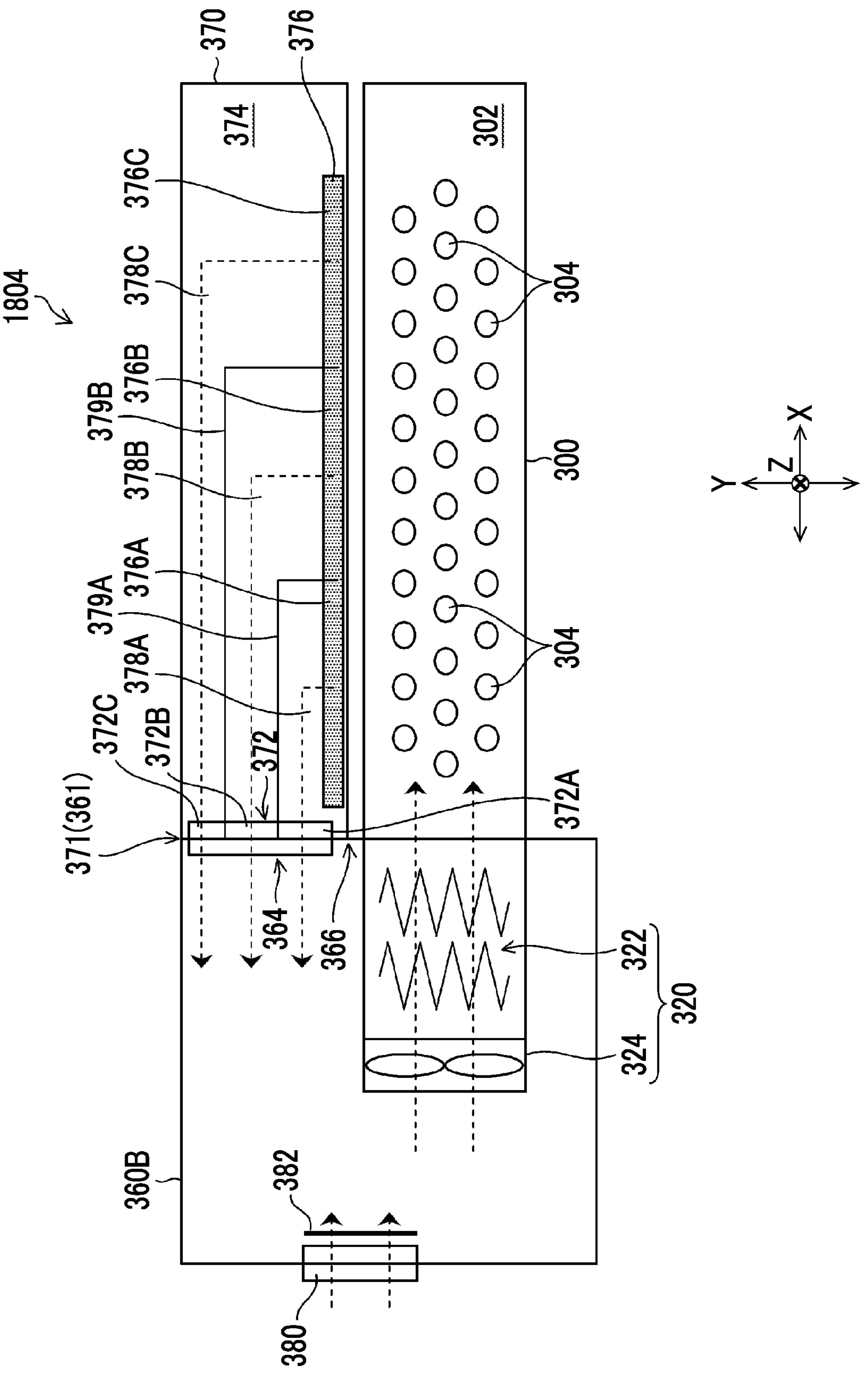
FIG. 9 is a bottom view showing a configuration example of a drying module according to a fourth embodiment.

FIG. 9 is a bottom view showing a configuration example of a drying module according to a fourth embodiment. In the case of a drying module 1804 according to the fourth embodiment, the volume per unit period of the heated gas circulated from the heated gas recovery unit 370 to a heated gas generation box 360B is controlled.

For the heated gas recovery unit 370, complete circulation is applied in which all the heated gas blown from the nozzles 304 to the film substrate 1 is recovered via the heated gas recovery port 376. In a case where a plurality of drying modules 1804 are provided and the plurality of drying modules 1804 are disposed along the substrate transport direction, at the drying module 1804 that is disposed at a position on an upstream side in the substrate transport direction, the amount of water evaporation may be relatively large and the humidity may rise to a relatively high humidity in comparison with the drying module 1804 that is disposed at a position on a downstream side in the substrate transport direction. The rise in humidity may decrease the efficiency of a drying process.

In the case of the drying module 1804, the heated gas generation box 360B is provided with a third intake port 380. Fresh air from the outside of the drying module 1804 is taken into the heated gas generation box 360B via the third intake port 380, so that the humidity in the heated gas generation box 360B is adjusted.

The third intake port 380 includes an opening area adjustment mechanism 382 that adjusts the opening area thereof. The opening area adjustment mechanism 382 may include a shutter and a shutter drive mechanism that drives the shutter.

A configuration in which a plurality of openings is provided may be applied as the third intake port 380. In the case of a configuration in which a plurality of openings are provided as the third intake port 380, a blocking mechanism that selectively blocks one or more of the plurality of openings may be applied as the opening area adjustment mechanism 382.

Regarding the third intake port 380, a pressure loss adjustment mechanism may be provided for the third intake port 380 instead of the opening area adjustment mechanism 382 or together with the opening area adjustment mechanism 382. Note that the pressure loss adjustment mechanism is not shown. The drying controller 168 shown in FIG. 2 performs drive control or the like in the opening area adjustment mechanism 382, the pressure loss adjustment mechanism, or the like.

The drying module 1804 may include at least one of a temperature sensor or a humidity sensor, detect at least one of the temperature or the humidity in the heated gas generation box 360B, and control the operation of the opening area adjustment mechanism 382 or the like based on the result of the detection.

It is preferable that the temperature sensor or the like is disposed at a position near the second intake port 364. Examples of the position near the second intake port 364 include a surface 366 at an inner side of the edge surface 361 in which the second intake port 364 is formed. The sensor 176 shown in FIG. 2 includes the temperature sensor or the like provided in the heated gas generation box 360B.

Note that the opening area adjustment mechanism 382 described in the embodiment is an example of an adjustment mechanism that adjusts the volume per unit period of a gas passing through a third intake port.

Fifth Embodiment

Figure 10:
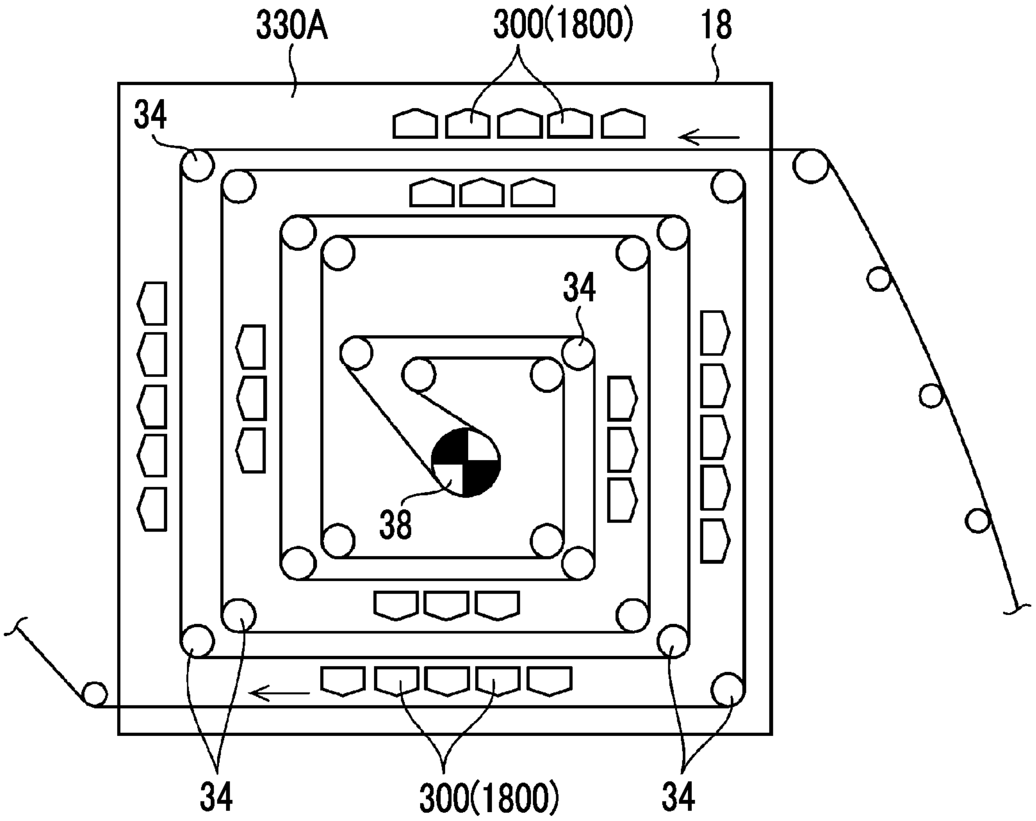
FIG. 10 is a side view of a drying device that shows a configuration example of a drying device according to a fifth embodiment.

FIG. 10 is a side view of a drying device that shows a configuration example of a drying device according to a fifth embodiment. Note that the drawing schematically shows an example of an internal structure of the drying furnace 330A provided in the drying device 18. In addition, in the drawing, the nozzle unit 300 disposed in the drying furnace 330A is shown and the heater unit 320 disposed outside the drying furnace 330A is not shown. An arrow line shown in the drawing represents the substrate transport direction.

In the drying device 18 shown in FIG. 10, a circumferential substrate transport path along which the film substrate 1 goes around inside the drying furnace 330A is defined. Inside the drying furnace 330A, a plurality of pass rollers 34 are disposed along the substrate transport path.

In addition, a drive roller 38 is disposed inside the drying furnace 330A. The substrate transport path is folded at the position of the drive roller 38. Accordingly, the length of the substrate transport path required for the drying of the film substrate 1 is secured and the drying furnace 330A is made compact.

FIG. 10 shows a configuration in which 32 nozzle units 300 are dispersively disposed inside the drying furnace 330A. The number of nozzle units 300 disposed inside the drying furnace 330A can be appropriately determined in accordance with the length of the substrate transport path, the size of each nozzle unit 300, and the like.

The drying device 18 having such a structure performs a drying process for a printed image that is printed on the film substrate 1 and that is obtained by superimposing a color image printed by means of aqueous color ink of four colors on a background image printed by means of aqueous white ink, an impermeable medium being applied as the film substrate 1.

In a case where a background image is printed by means of white ink, the amount of ink applied to the film substrate 1 is large in comparison with a case where only a color image is printed and thus there is a problem in reducing power consumption in the drying device 18 and performing a discharge process or the like.

In a case where a structure described in JP2002-292841A, in which a heater faces a substrate transport path, is applied to the drying device 18 having a structure shown in FIG. 10, the size of a drying module 1800 in a direction orthogonal to the substrate transport surface may be increased and the size of the drying furnace 330A may be increased.

On the other hand, in the drying device 18 according to the present embodiment, the heater unit 320 is disposed at a position that does not face the substrate transport surface. Accordingly, an increase in size of the drying furnace 330A in the direction orthogonal to the substrate transport surface is prevented.

In addition, in the case of the drying module 1800 shown in FIG. 10, an increase in size of the drying module 1800 is prevented also in the substrate transport direction. That is, in the case of the drying module 1800, the heater unit 320 is not disposed at a position adjacent to the nozzle unit 300 in the substrate transport direction. Therefore, the distance between the drying modules 1804 that are adjacent to each other can be relatively shortened and an increase in size of the drying furnace 330A in the substrate transport direction is prevented.

Note that any of the drying module 1802 shown in FIG. 6, the drying module 1803 shown in FIG. 7, or the drying module 1804 shown in FIG. 9 may be applied as the drying modules 1800 shown in FIG. 10.

Figure 11:
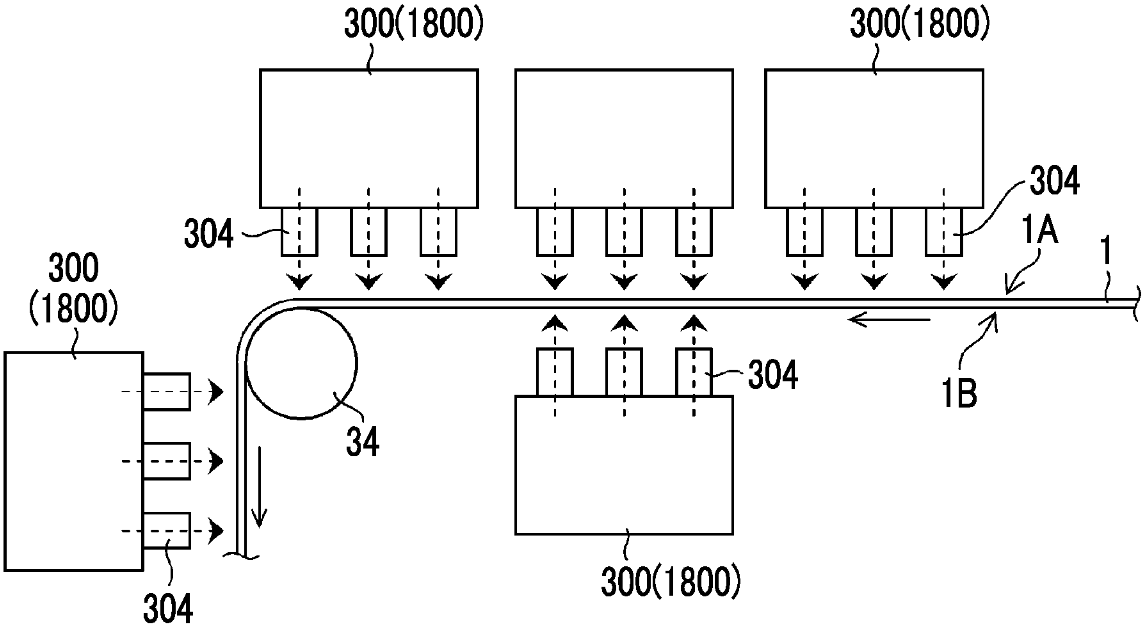
FIG. 11 is a side view of a drying device that shows an example of disposition of drying modules.

FIG. 11 is a side view of a drying device that shows another example of disposition of drying modules. Note that the drawing shows a part of the substrate transport path in the drying furnace 330A shown in FIG. 10. An arrow line shown in the drawing represents the substrate transport direction.

The drying modules 1800 shown in FIG. 11 are disposed on a side close to the printing surface 1A of the film substrate 1 and on a side close to the substrate support surface 1B. Accordingly, a drying process can be collectively performed with respect to the printing surface 1A and the substrate support surface 1B of the film substrate 1.

In such a configuration, the way in which the nozzle units 300 and the heater units 320 are disposed in the drying modules 1800 disposed on the side close to the printing surface 1A of the film substrate 1 is preferably switched at the drying modules 1800 disposed on the side close to the substrate support surface 1B of the film substrate 1. In this case, the heater units 320 can be disposed on the same side in the substrate width direction in the drying furnace 330A.

Figure 12:
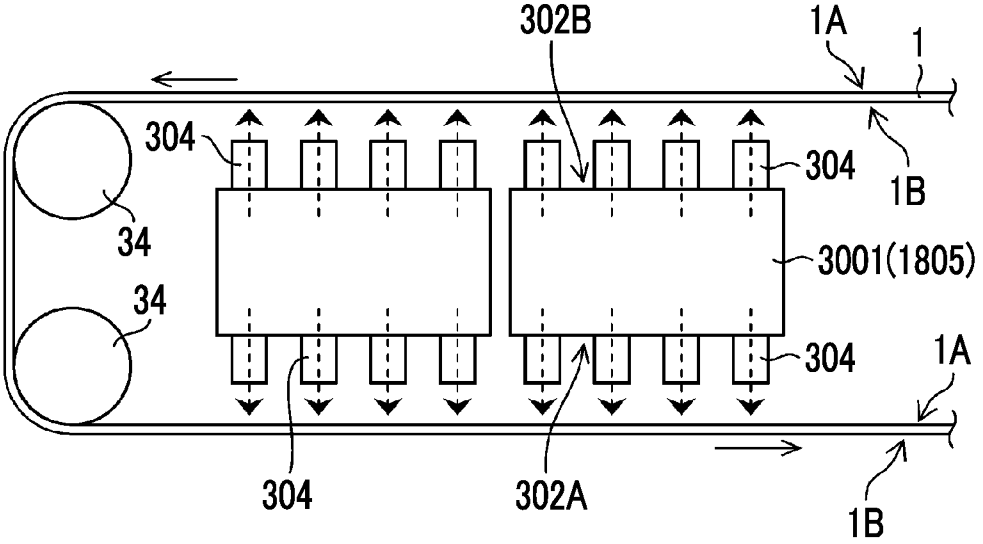
FIG. 12 is a side view of a drying device that shows a modification example of drying modules.

FIG. 12 is a side view of a drying device that shows a modification example of drying modules. Note that an arrow line shown in FIG. 12 represents the substrate transport direction.

A nozzle unit 3001 provided in a drying module 1805 shown in FIG. 12 includes a first nozzle disposition surface 302A and a second nozzle disposition surface 302B. A plurality of nozzles 304 are disposed at the first nozzle disposition surface 302A and the second nozzle disposition surface 302B.

In the case of the nozzle unit 3001 shown in FIG. 12, an upper surface of the nozzle unit 3001 having a rectangular parallelepiped shape is the first nozzle disposition surface 302A and a bottom surface thereof is the second nozzle disposition surface 302B. That is, one of two surfaces of the nozzle unit 3001 shown in FIG. 12 that are parallel to each other is the first nozzle disposition surface 302A and the other of the two surfaces is the second nozzle disposition surface 302B.

The first nozzle disposition surface 302A and the second nozzle disposition surface 302B are not limited to surfaces parallel to each other and surfaces orthogonal to each other may be applied as the first nozzle disposition surface 302A and the second nozzle disposition surface 302B. Examples of a configuration in which surfaces orthogonal to each other are applied include a configuration in which the first nozzle disposition surface 302A is an upper surface of a rectangular parallelepiped and the second nozzle disposition surface 302B is a side surface of the rectangular parallelepiped.

According to such a modification example, the heated gas can be blown in a plurality of directions from one nozzle unit 3001. Note that, the nozzle disposition surfaces are not limited to two surfaces and three or more surfaces of a polyhedron may serve as the nozzle disposition surfaces.

Referring again to FIG. 10, in a case where a plurality of drying modules 1800 are disposed in the substrate transport direction, a region on an upstream side in the substrate transport direction is a constant rate drying section in which the amount of water evaporation is relatively large and a humidity is likely to rise. Therefore, the volume of the outside air taken into the heated gas generation box 360B via the third intake port 380 shown in FIG. 9 is relatively large.

Meanwhile, a region on a downstream side in the substrate transport direction is a falling rate drying section in which the amount of water evaporation is relatively small and a humidity is not likely to rise. Therefore, the volume of the outside air taken into the heated gas generation box 360B via the third intake port 380 is relatively small.

That is, the volume per unit period of a gas passing through the third intake port 380 in the drying module 1800 disposed at a position on the downstream side in the substrate transport direction is smaller than the volume per unit period of a gas passing through the third intake port 380 in the drying module 1800 disposed at a position on the upstream side in the substrate transport direction.

Examples of the region on the upstream side in the substrate transport direction include a region extending from a starting point which is a position at which transport of the film substrate 1 in the drying device 18 is started to a position that is separated from the starting point by a distance of 15% or more and 20% or less of the total length of the substrate transport path.

Examples of the region on the downstream side in the substrate transport direction include a region extending from the position that is separated from the starting point by a distance of 15% or more and 20% or less of the total length of the substrate transport path to a position at which the transport of the film substrate 1 in the drying device 18 ends.

Actions and Effects of Drying Device According to Embodiments

With the drying device according to the embodiments, it is possible to achieve the following actions and effects.

[1]

The nozzle unit 300 that blows the heated gas to the film substrate 1 is disposed at a position facing the substrate transport surface. The heater unit 320 that supplies the heated gas to the nozzle unit 300 is disposed at a position that does not face the substrate transport surface. Accordingly, an increase in size of the drying module in a direction facing the substrate transport surface is suppressed.

[2]

The drying module 1801 is disposed inside the drying furnace 330. Accordingly, it is possible to realize a reduction in heat loss.

[3]

The nozzle unit 300 is disposed inside the drying furnace 330A and the heater unit 320 is disposed outside the drying furnace 330A. Accordingly, it is easy to perform maintenance of the axial fan 324 or the like provided in the heater unit 320.

[4]

The heater unit 320 is disposed inside the heated gas generation box 360. Accordingly, the axial fan 324 can blow the heated gas in the heated gas generation box 360 to the nozzle unit 300 without escape of thermal energy generated by the heater unit 320 from the heated gas generation box 360.

[5]

The heated gas generation box 360 includes the first intake port 362 through which outside air is taken in. Accordingly, the heater unit 320 can generate the heated gas by using air outside the heated gas generation box 360.

[6]

The heated gas recovery unit 370 that recovers the heated gas released from the nozzle unit 300 is provided. In the case of the heated gas recovered to the heated gas recovery unit 370, the heated gas is recovered to the heated gas generation box 360A via the heated gas discharge port 372 and the second intake port 364. Accordingly, thermal energy circulation in which a high-temperature heated gas in the drying furnace 330A is recovered to the heated gas generation box 360A is realized and it is possible to achieve a power saving effect with the drying module 1803.

[7]

The heated gas recovery port 376 is divided into the plurality of intake regions in a medium width direction. The heated gas recovery unit 370 includes a plurality of intake flow channels respectively connected to the plurality of intake regions. The plurality of intake flow channels are respectively connected to a plurality of discharge regions into which the heated gas discharge port 372 is divided. Accordingly, the heated gas recovery unit 370 can take in the heated gas uniformly in the substrate width direction.

[8]

The heated gas generation box 360B includes the third intake port 380 through which outside air is taken in. Accordingly, with the drying module 1804, it is possible to suppress a decrease in drying efficiency that is caused by an increase in humidity inside the heated gas generation box 360B.

[9]

The heated gas generation box 360B includes the opening area adjustment mechanism 382 that adjusts the opening area of the third intake port 380. Accordingly, the heated gas generation box 360B can adjust the volume of outside air sucked thereinto.

[10]

The heated gas generation box 360B includes at least one of a temperature sensor or a humidity sensor near the second intake port 364. Accordingly, the opening area of the third intake port 380 can be adjusted in accordance with at least any one of the temperature or the humidity of a gas flowing into the heated gas generation box 360B via the second intake port 364.

[11]

In a case where a plurality of drying modules 1800 are disposed in the substrate transport direction, at the drying module 1800 disposed at a position on the upstream side in the substrate transport direction, the volume of outside air taken in via the third intake port 380 is relatively large in comparison with the drying module 1800 disposed at a position on the downstream side in the substrate transport direction. Accordingly, the drying efficiency of the entire drying device 18 can be improved.

[12]

The drying module 1800 is disposed on a side close to the substrate support surface 1B of the film substrate 1. Accordingly, a drying process can be performed on the film substrate 1 from the side close to the substrate support surface 1B of the film substrate 1.

[13]

In the case of the nozzle unit 3001 configured in the form of a polyhedron, the nozzles 304 are disposed at a plurality of surfaces such as the first nozzle disposition surface 302A and the second nozzle disposition surface 302B. Accordingly, it is possible to blow the heated gas in a plurality of directions.

Specific Example of Material Applied to Nozzle Unit

Regarding the drying device 18, a drying process temperature is changed in accordance with the material of the film substrate 1, the thickness of the film substrate 1, and an image to be printed on the film substrate 1. The thermal responsiveness of the nozzle unit 300 shown in FIG. 4 and the like may be decreased in a case where the thickness of a material applied thereto is relatively large and in a case where the heat capacity of a material applied thereto is relatively large.

As the nozzle unit 300 shown in FIG. 4 and the like, a metal housing having a rectangular parallelepiped shape and a hollow structure is applied. Accordingly, a certain thermal responsiveness of the nozzle unit 300 in the case of a change in drying process temperature is secured and thus a waiting time in the case of a change in drying process temperature can be shortened.

That is, a material applied to the nozzle unit 300 is preferably a metal material having a smaller heat capacity in the viewpoint of ensuring a certain thermal responsiveness. Examples of the metal material applied to the nozzle unit 300 include iron, stainless steel, and the like.

The nozzle unit 300 is preferably formed of one kind of metal material and is preferably formed by applying bending processing and welding to a metal plate as a processing method. In the viewpoint of two-dimensionally dispersively disposing the plurality of nozzles 304 at the nozzle disposition surface 302, it is preferable that a material having a certain thickness and having both of workability and stiffness is applied to the nozzle unit 300.

The point of the nozzle unit 300 is to make the volume of the housing as small as possible in the viewpoint of reducing the heat capacity. Meanwhile, in a case where the heated gas flows into the nozzle unit 300 has a rectangular parallelepiped shape through a surface parallel to the nozzle disposition surface 302, the volume per unit period of the heated gas supplied to the nozzles 304 at positions separated from a heated gas inflow port is decreased with respect to the nozzles 304 at positions facing the heated gas inflow port and thus blowing the heated gas uniformly may become difficult. The influence of blowing distribution is great in the longitudinal direction of the nozzle unit 300 in comparison with the lateral direction thereof.

Although it is possible to suppress the blowing distribution of the heated gas by making the distance between a heated gas inflow surface and the nozzle disposition surface 302 relatively large, the heat capacity of the entire nozzle unit 300 is relatively increased in this case.

Although it is possible to suppress the blowing distribution of the heated gas by disposing a regulation member such as a rectifying plate in the nozzle unit 300, the internal structure of the nozzle unit 300 may become complicated and there may be an increase in flow channel resistance in the nozzle unit 300 in this case.

With regard to this, as shown in FIG. 4 and the like, the heated gas inflow port 308 is disposed at the side surface 306 of the nozzle unit 300 that is orthogonal to the nozzle disposition surface 302. Accordingly, the height of the nozzle unit 300 is suppressed to be small and the blowing distribution of the heated gas is suppressed in the longitudinal direction of the nozzle unit 300.

FIG. 13 is a table that shows evaluation results related to the thickness of a metal plate applied to the nozzle unit. FIG. 13 shows the evaluation results obtained through evaluation that is performed in the viewpoints of workability, pressure loss, and thermal responsiveness by using the thickness of the metal plate as a parameter.

In the table shown in FIG. 13, an evaluation result “A” means “optimum”. An evaluation result “B” means “appropriate”. An evaluation result “C” means “conditionally appropriate”. An evaluation result “D” means “inappropriate”. The same applies to the table shown in FIG. 14.

Regarding the workability, in a case where the thickness is smaller than 1.5 mm, processing accuracy may decrease because of a lack of rigidity of the metal plate itself. Therefore, in the viewpoint of workability, the thickness of the metal plate is preferably equal to or larger than 1.5 mm In addition, in a case where the thickness of the metal plate exceeds 3.5 mm, the difficulty of processing may be relatively high in a case of securing a certain processing accuracy while forming the nozzles 304 each having a diameter smaller than 100 micrometers. Therefore, the thickness of the metal plate is preferably equal to or smaller than 3.5 mm The pressure loss is determined based on the volume per unit period of the heated gas blown from the nozzles 304. As an index value of the pressure loss, a value measured by an anemometer disposed at a position separated from the positions of the nozzles 304 by a certain distance may be applied. In a case where the thickness of the metal plate is relatively large, the flow channel resistance in each nozzle 304 is relatively increased and the pressure loss inside the nozzle unit 300 is relatively increased.

For example, a wind speed may be measured at a plurality of positions on the nozzle disposition surface 302 in a state where the output such as the duty of the axial fan 324 is made constant and the arithmetic mean value of values measured at the positions may be used as an index value of the pressure loss. Examples of the plurality of positions include four corners of the nozzle disposition surface 302 and the center of the nozzle disposition surface.

That is, regarding the pressure loss, in a case where the thickness of the metal plate is equal to or larger than 3.5 mm, a decrease in heated gas blowing pressure may be caused by an increase in flow channel resistance in the nozzles 304. Therefore the thickness of the metal plate being equal to or larger than 3.5 mm is appropriate under certain drying conditions. Meanwhile, the thickness of the metal plate being smaller than 3.5 mm is optimum or appropriate.

The thermal responsiveness is determined based on the length of a period between a time at which a change in temperature settings of the heater unit 320 is made and a time at which the temperature of the heated gas blown from the nozzles 304 reaches a prescribed temperature. In a case where the thickness of the metal plate is relatively large, the heat capacity of the nozzle unit 300 is relatively increased and the thermal responsiveness may be relatively decreased. That is, regarding the thermal responsiveness, in a case where the thickness is equal to or larger than 3.5 mm, a decrease in thermal responsiveness may be caused by an increase in heat capacity in the nozzles 304. Therefore, the thickness being equal to or larger than 3.5 mm is appropriate under certain drying conditions. Meanwhile, the thickness of the metal plate being smaller than 3.5 mm is optimum or appropriate.

The “comprehensive determination” in the table shown in FIG. 13 represents an evaluation result made based on a comprehensive consideration of the workability, the pressure loss, and the thermal responsiveness. In a case where the thickness is smaller than 1.5 mm, the result of the comprehensive determination is “inappropriate” and in a case where the thickness is equal to or larger than 1.5 mm and smaller than 2.0 mm, the result of the comprehensive determination is “optimum”.

In addition, in a case where the thickness is equal to or larger than 2.0 mm and smaller than 3.5 mm, the result of the comprehensive determination is “appropriate” and in a case where the thickness is equal to or larger than 3.5 mm, the result of the comprehensive determination is “conditionally appropriate”.

That is, the thickness of the metal plate applied to the nozzle unit 300 is preferably equal to or larger than 1.5 mm, more preferably equal to or larger than 1.5 mm and smaller than 3.5 mm. The thickness of the metal plate is still more preferably equal to or larger than 1.5 mm and smaller than 2.5 mm Specific Example of Structure Applied to Nozzle Unit In order for the nozzle unit 300 to uniformly jet the heated gas from all of the nozzles 304, the heated gas needs to be stored in the nozzle unit 300. That is, the nozzle unit 300 has a structure in which the opening area of the heated gas inflow port 308 is equal to or smaller than one times a total nozzle area, which is calculated as the sum of the opening areas of all of the nozzles 304.

FIG. 14 is a table that shows evaluation results related to a structure applied to the nozzle unit. FIG. 14 shows the evaluation results obtained through evaluation that is performed in the viewpoints of pressure loss and wind speed unevenness. The area ratio in the table shown in FIG. 14 represents the ratio of the opening area of the heated gas inflow port 308 to the total nozzle area.

As with the evaluation related to the thickness of the metal plate, the pressure loss is determined based on the volume per unit period of the heated gas blown from the nozzles 304 and a value measured by an anemometer disposed at a position separated from the positions of the nozzles 304 by a certain distance may be applied as an index value of the pressure loss. As the position separated from the positions of the nozzles 304 by a certain distance, the position of the substrate transport surface may be applied.

Regarding the pressure loss, in a case where the area ratio is smaller than 0.1, the opening area of each nozzle 304 becomes relatively small and there is an increase in pressure loss caused by an increase in flow channel resistance in each nozzle 304. Therefore, the area ratio being smaller than 0.1 is inappropriate. In addition, the area ratio being equal to or larger than 0.1 and smaller than 0.4 is conditionally appropriate. Furthermore, regarding the pressure loss, the area ratio being equal to or larger than 0.4 and smaller than 0.7 is appropriate and the area ratio being equal to or larger than 0.7 is optimum.

The wind speed unevenness is determined based on whether or not the wind speeds of the heated gases blown from all of the nozzles 304 fall within a prescribed range. For example, regarding an index value of the wind speed unevenness, wind speeds at a plurality of positions in the longitudinal direction of the nozzle unit 300 may be used as the index value. As the plurality of positions, a plurality of positions used for derivation of the index value of the pressure loss may be adopted.

Regarding the wind speed unevenness, the area ratio being smaller than 0.1 is optimum and the area ratio being equal to or larger than 0.1 and smaller than 0.7 is appropriate. In addition, regarding the wind speed unevenness, the area ratio being equal to or larger than 0.7 and smaller than 1.0 is conditionally appropriate. Meanwhile, the area ratio exceeding 1.0 is inappropriate.

The "comprehensive determination" in the table shown in FIG. 14 represents an evaluation result made based on a comprehensive consideration of the pressure loss and the wind speed unevenness. The area ratio being less than 0.1 and the area ratio exceeding 1.0 are inappropriate and the area ratio being equal to or greater than 0.1 and smaller than 0.4 and the area ratio being equal to or greater than 0.7 and equal to or smaller than 1.0 are appropriate. In addition, the area ratio being equal to or larger than 0.4 and smaller than 0.7 is optimum.

That is, the ratio of the opening area of the heated gas inflow port 308 to the total nozzle area of the nozzle unit 300 is preferably equal to or larger than 0.1 and equal to or smaller than 1.0 and more preferably equal to or larger than 0.4 and smaller than 0.7.

About Terms

The term "pre-coating liquid" has the same meaning as terms such as "pretreatment liquid" and "treatment liquid" and is a general term for liquid applied before printing. The pre-coating liquid is an example of coating liquid.

The term "printing apparatus" has the same meaning as terms such as "printing machine", "printer", "character printing apparatus", "image recording apparatus", "image forming apparatus", "image output apparatus", and "drawing apparatus". The term "image" should be interpreted in a broad sense and includes a color image, a black-and-white image, a single-color image, a gradation image, a uniform density image, and the like.

The term "printing" includes the concepts of terms such as "image recording", "image formation", "character printing", "drawing" and "printing". The term "device" can include the concept of a system.

The term "image" is not limited to a photographic image, but is used as a comprehensive term including a drawing pattern, a character, a symbol, a line art, a mosaic pattern, a color-coded pattern, various other patterns, and an appropriate combination thereof. Further, the term "image" may include the meaning of an image signal and image data indicating an image.

Regarding the embodiment of the present invention described above, the constituent requirements can be appropriately changed, added, or deleted without departing from the spirit of the present invention. The present invention is not limited to the embodiment described above, and various modifications can be made by a person having ordinary knowledge in the art within the technical idea of the present invention. In addition, the embodiment, the modification examples, and an application example may be combined with each other as appropriate.

EXPLANATION OF REFERENCES

1: film substrate
1A: printing surface
1B: substrate support surface
10: ink jet printing system
12: paper feeding device
14: pre-coating device
16: jetting device
18: drying device
20: examination device
22: recovery device
24: transport device
30: ink jet head
30C: ink jet head
30K: ink jet head
30M: ink jet head
30W: ink jet head
30Y: ink jet head
32: scanner
34: pass roller
36: tension pickup
38: drive roller
160: system controller
162: transport controller
164: pre-coating controller
166: jetting controller
168: drying controller
170: examination controller
172: test pattern determination unit
173: printed image determination unit
174: memory
176: sensor
200: control device
202: processor
204: computer-readable medium
206: communication interface
208: input and output interface
210: bus
214: input device
216: display device
220: transport control program
222: pre-coating control program
224: jetting control program
226: drying control program
228: examination control program
230: test pattern determination program
300: nozzle unit
301: one end
302: nozzle disposition surface
302A: first nozzle disposition surface

302*b*: second nozzle disposition surface
304: nozzle
306: side surface
308: heated gas inflow port
320: heater unit
322: heater
323: heater case
324: axial fan
326: heated gas supply port
327: gas supply port disposition surface
330: drying furnace
330A: drying furnace
331: end surface
332: opening
360: heated gas generation box
360A: heated gas generation box
360B: heated gas generation box
361: other end surface
362: first intake port
364: second intake port
366: surface
370: heated gas recovery unit
371: one end surface
372: heated gas discharge port
372A: first discharge region
372B: second discharge region
372C: third discharge region
376: heated gas recovery port
376A: first intake region
376B: second intake region
376C: third intake region
378A: first intake flow channel
378B: second intake flow channel
378C: third intake flow channel
379A: first partition wall
379B: second partition wall
380: third intake port
382: opening area adjustment mechanism
1801: drying module
1801A: drying module
1802: drying module
1803: drying module
1804: drying module
1805: drying module
3001: nozzle unit

What is claimed is:

1. A blowing unit that has a hollow structure and blows air via a plurality of jetting ports disposed at a first surface,
wherein a gas inflow port through which a gas supplied from a gas supply source flows in is formed in a second surface which intersects the first surface and at which the jetting ports are not disposed, and
a ratio of a sum of opening areas of the plurality of jetting ports to an opening area of the gas inflow port is equal to or larger than 0.4 and smaller than 0.7.

2. The blowing unit according to claim 1,
wherein the second surface is brought into contact with a gas supply port disposition surface of the gas supply source at which a gas supply port is disposed so that the gas inflow port is bonded to the gas supply port.

3. The blowing unit according to claim 1,
wherein the blowing unit is formed by using one kind of metal plate having a thickness equal to or larger than 1.5 mm and smaller than 3.5 mm.

4. The blowing unit according to claim 1,
wherein a plurality of the first surfaces are provided.

5. The blowing unit according to claim 1,
wherein two-dimensional disposition is applied to disposition of the plurality of jetting ports at the first surface.

6. The blowing unit according to claim 1,
wherein a length of the blowing unit in a longitudinal direction corresponds to a length of any one side of a substrate to which air is blown.

7. A drying device comprising:
a blowing unit that has a hollow structure and blows air via a plurality of jetting ports disposed at a first surface; and
a gas supply unit that supplies a gas to the blowing unit,
wherein the blowing unit is provided with a gas inflow port through which a gas supplied from a gas supply source flows in and that is formed in a second surface which intersects the first surface and at which the jetting ports are not disposed, and
a ratio of a sum of opening areas of the plurality of jetting ports to an opening area of the gas inflow port is equal to or larger than 0.4 and smaller than 0.7.

8. The drying device according to claim 7,
wherein the gas supply unit includes
a heat source; and
a fan motor that generates an air stream toward the heat source.

9. A liquid applying system comprising:
a liquid applying device that applies liquid to a substrate; and
a drying device that blows air to a substrate transport surface in a substrate transport path to dry the substrate to which the liquid has been applied,
wherein the drying device includes
a blowing unit that has a hollow structure and blows air via a plurality of jetting ports disposed at a first surface, and
a gas supply unit that supplies a gas to the blowing unit,
the blowing unit is provided with a gas inflow port through which a gas supplied from a gas supply source flows in and that is formed in a second surface which intersects the first surface and at which the jetting ports are not disposed, and
a ratio of a sum of opening areas of the plurality of jetting ports to an opening area of the gas inflow port is equal to or larger than 0.4 and smaller than 0.7.

10. A printing system comprising:
a printing apparatus that prints an image on a substrate; and
a drying device that blows air to a substrate transport surface in a substrate transport path to dry the substrate on which the image has been printed,
wherein the drying device includes
a blowing unit that has a hollow structure and blows air via a plurality of jetting ports disposed at a first surface, and
a gas supply unit that supplies a gas to the blowing unit,
the blowing unit is provided with a gas inflow port into which a gas supplied from a gas supply source flows and that is formed in a second surface which intersects the first surface and at which the jetting ports are not disposed, and
a ratio of a sum of opening areas of the plurality of jetting ports to an opening area of the gas inflow port is equal to or larger than 0.4 and smaller than 0.7.

* * * * *